(12) United States Patent
Zheng et al.

(10) Patent No.: US 9,011,992 B2
(45) Date of Patent: Apr. 21, 2015

(54) OPTICAL COMPENSATION FILMS BASED ON STRETCHED POLYMER FILMS

(75) Inventors: Xiaoliang Joe Zheng, Akron, OH (US); Frank W. Harris, Boca Raton, FL (US); Ted Calvin Germroth, Kingsport, TN (US); Jiaokai Alexander Jing, Uniontown, OH (US); Dong Zhang, Uniontown, OH (US); Thauming Kuo, Kingsport, TN (US); Brian Michael King, Jonesborough, TN (US)

(73) Assignee: Akron Polymer Systems, Akron, OH (US)

( * ) Notice: Subject to any disclaimer, the term of this patent is extended or adjusted under 35 U.S.C. 154(b) by 1925 days.

(21) Appl. No.: 12/229,401

(22) Filed: Aug. 22, 2008

(65) Prior Publication Data

US 2009/0068380 A1 Mar. 12, 2009

Related U.S. Application Data

(63) Continuation-in-part of application No. 11/731,367, filed on Mar. 29, 2007, now Pat. No. 8,226,860.

(51) Int. Cl.
| | |
|---|---|
| *C09K 19/02* | (2006.01) |
| *C08F 12/08* | (2006.01) |
| *C08F 12/26* | (2006.01) |
| *B29D 11/00* | (2006.01) |
| *C08F 22/30* | (2006.01) |
| *G02F 1/13363* | (2006.01) |
| *G02B 1/04* | (2006.01) |
| *G02B 5/30* | (2006.01) |

(52) U.S. Cl.
CPC .......... *G02F 1/13363* (2013.01); *G02B 5/3016* (2013.01); *G02B 5/3083* (2013.01); *G02B 1/04* (2013.01)
USPC .............................. 428/1.3; 526/311; 526/293

(58) Field of Classification Search
None
See application file for complete search history.

(56) References Cited

U.S. PATENT DOCUMENTS

| | | | |
|---|---|---|---|
| 5,100,986 A | 3/1992 | Favstritsky et al. | |
| 5,119,221 A | 6/1992 | Nakajima et al. | |
| 5,189,538 A * | 2/1993 | Arakawa ........................ | 349/120 |
| 5,213,852 A | 5/1993 | Arakawa et al. | |
| 5,290,887 A | 3/1994 | Hefner et al. | |
| 5,387,657 A | 2/1995 | Hefner et al. | |
| 5,529,818 A | 6/1996 | Tsuda et al. | |
| 6,115,095 A | 9/2000 | Suzuki et al. | |
| 6,175,400 B1 | 1/2001 | Duncan et al. | |
| 7,037,443 B2 | 5/2006 | Shuto et al. | |
| 7,135,211 B2 | 11/2006 | Shuto et al. | |
| 7,227,602 B2 | 6/2007 | Jeon et al. | |
| 7,236,221 B2 | 6/2007 | Ishikawa et al. | |
| 7,391,935 B2 * | 6/2008 | Kawahara et al. ............... | 385/11 |
| 8,545,970 B2 | 10/2013 | Doi et al. | |
| 2004/0051831 A1 | 3/2004 | Su Yu et al. | |
| 2004/0242823 A1 | 12/2004 | Sekiguchi et al. | |
| 2005/0057714 A1 | 3/2005 | Jeon et al. | |
| 2005/0190327 A1 | 9/2005 | Lin et al. | |
| 2005/0200792 A1 | 9/2005 | Jeon et al. | |
| 2005/0270458 A1 | 12/2005 | Ishikawa et al. | |
| 2006/0097224 A1 | 5/2006 | Hanelt et al. | |
| 2006/0114383 A1 | 6/2006 | Kobayashi et al. | |
| 2007/0132925 A1 | 6/2007 | Nakayama | |
| 2007/0160828 A1 | 7/2007 | Iyama | |
| 2007/0195243 A1 | 8/2007 | Miyatake et al. | |
| 2007/0206140 A1 | 9/2007 | Ting et al. | |
| 2007/0279553 A1 | 12/2007 | Yoda et al. | |
| 2009/0002606 A1 | 1/2009 | Tomonaga et al. | |
| 2009/0185121 A9 | 7/2009 | Suemasu et al. | |

FOREIGN PATENT DOCUMENTS

| | | |
|---|---|---|
| EP | 1 506 991 | 2/2005 |
| JP | 2-77016 | 3/1990 |
| JP | 7-20468 | 1/1995 |
| JP | 07-072487 | 3/1995 |
| JP | 7-72488 | 3/1995 |
| JP | 2001-091746 | 4/2001 |
| JP | 2002-090530 A | 3/2002 |
| JP | 2002-309010 | 10/2002 |
| JP | 2005-242360 A | 9/2005 |
| JP | 2006-045368 | 2/2006 |
| JP | 2006-126770 | 5/2006 |
| JP | 2006-178401 A | 7/2006 |
| JP | 2006-194923 A | 7/2006 |
| JP | 2006-201502 A | 8/2006 |
| JP | 2006-221116 A | 8/2006 |
| JP | 2006-527394 A | 11/2006 |

(Continued)

OTHER PUBLICATIONS

Tenneti et al. "Perforated Layer Structures in Liquid Crystalline Rod-Coil Block Copolymers" J. Am. Chem. Soc. 2005, 127, pp. 15481-15490.

Zhang et al. "Synthesis and characterization of novel rod-coil diblock copolymers of poly(methyl methacrylate) and liquid crystalline segments of poly(2,5-bis[(4-methoxyphenyl)oxycarbonyl] styrene)", Polym Int 52:92-97 (2003).

Ye et al. "Molecular Weight Dependence of Phase Structures and Transitions of Mesogen-Jacketed Liquid Crystalline Polymers Based on 2-Vinylterephthalic Acids" Macromolecules 2004, 37, 7188-7196.

(Continued)

*Primary Examiner* — J. L. Yang
(74) *Attorney, Agent, or Firm* — Kenyon & Kenyon LLP

(57) ABSTRACT

The present invention provides uniaxially stretched polymer films that have a refractive index profile suitable for use as negative A-plates or biaxial birefringent plates in a liquid crystal display (LCD) device. These wave plates can be used to compensate for the phase retardations existing in various modes of LCDs including TN (twisted nematic), VA (vertically aligned), IPS (in-plane switching), and OCB (optically compensated bend), and therefore improving the viewing quality of the displays.

33 Claims, No Drawings

(56) References Cited

FOREIGN PATENT DOCUMENTS

| JP | 2006-328267 | | 12/2006 |
|---|---|---|---|
| JP | 2007046059 | A | 2/2007 |
| JP | 2007-179026 | | 7/2007 |
| JP | 2008-134579 | A | 6/2008 |
| JP | 2009-520240 | | 5/2009 |
| TW | 200821351 | | 5/2008 |
| WO | WO 2005/017613 | | 2/2005 |
| WO | WO-2005121880 | A1 | 12/2005 |
| WO | WO-2008023668 | A1 | 2/2008 |
| WO | WO-2008099731 | A1 | 8/2008 |

OTHER PUBLICATIONS

Wan et al. ""Living" Free Radical Synthesis of a Novel Rodcoil Diblock Copolymers With Polystyrene and Mesogen-Jacketed Liquid Crystal Polymer Segments" Chinese Journal of Polymer Science, (1998) vol. 16 No. 4.

Chen et al. "Design, Synthesis, and Characterization of Bent-Core Mesogen-Jacketed Liquid Crystalline Polymers" Macromolecules 2006, 39, 517-527.

International Search Report dated Sep. 22, 2008 issued in corresponding PCT Application No. PCT/US2008/057789.

Database WPI Week 200728, Thomson Scientific, London, GB; AN 2007-286791, XP002494611.

Database WPI Week 199238, Thomson Scientific, London, GB; AN 1992-311534, XP0002493166.

Zhang et al.: "Synthesis of a New Side-Chain Type Liquid Crystal Polymer Poly[dicyclohexylvinylterephthalate]" Macromolecules, vol. 32, 1999, pp. 4494-4496, XP002495422.

Zhang D et al. "Mesogen-Jacketed Liquid Crystal Polymers with Mesogens of Aromatic Amide Structure" Polymers for Advanced Technologies, Wiley & Sons, Bognor Regis, GB, vol. 8, No. 4, Apr. 1, 1997, pp. 227-233, XP000691535.

Zhao et al., "Synthesis and characterization of diblock copolymers based on crystallizable poly($\epsilon$-caprolactone) and mesogen-jacketed liquid crystalline polymer block" Polymer, Elsevier Science Publishers B.V, GB, vol. 46, No. 14, Jun. 27, 2005, pp. 5396-5405, XP004924379, ISSN: 0032-3861.

Li et al., "Hierarchical Assembly of a Series of Rod-Coil Block Copolymers: Supramolecular LC Phase in Nanoenviroment", Macromolecules 2004, 37, 2854-2860.

Luo et al. "Conduction mechanism in a novel oxadiazole derivative: effects of temperature and hydrostatic pressure", J. Phys. D: Appl. Phys. 38 (2005) 1132-1135. IOP Publishing Ltd Printed in the UK.

Chai et al. "Synthesis and characterization of mesogen-jacketed liquid crystalline polymer containing 1,3,4-oxadiazole", Gaofenzi Xuebao 2006(3) 532-535.

European Search Report dated Jan. 30, 2013 issued in corresponding European Application No. 09 825 085.5.

Japanese Office Action dated Jul. 23, 2013 issued in corresponding JP Application No. 2011-523829 [With English Translation].

European Search Report dated Jan. 14, 2014 issued in corresponding EP Application No. 13 191 985.4-1301.

Office Action dated Feb. 4, 2014 issued in corresponding Japanese Patent Application No. 2011-523829 (with English Translation).

Office Action dated Mar. 17, 2014 issued in corresponding Taiwan Patent Application No. 098128443 (with English Translation of Office Action and Search Report).

European Search Report dated Aug. 18, 2014 issued in corresponding European Patent Application No. 13 191 985.4-1301.

International Search Report dated Apr. 22, 2010 issued in corresponding PCT Application No. PCT/US09/04840.

Japanese Office Action dated Jan. 6, 2015 issued in corresponding Japanese Application No. 2011-523829 (with English Translation).

* cited by examiner

OPTICAL COMPENSATION FILMS BASED ON STRETCHED POLYMER FILMS

CROSS REFERENCE TO RELATED APPLICATION

The present application is a Continuation-in-Part of U.S. patent application Ser. No. 11/731,367, filed Mar. 29, 2007 now U.S. Pat. No. 8,226,860, the contents all of which are incorporated herein by reference.

FIELD OF THE INVENTION

The present invention relates to uniaxially stretched polymer films that have a refractive index profile suitable for use as negative A-plates or biaxial birefringent plates in a liquid crystal display (LCD) device. These wave plates can be used to compensate for the phase retardations existing in various modes of LCDs including TN (twisted nematic), VA (vertically aligned), IPS (in-plane switching), and OCB (optically compensated bend), and therefore improving the viewing quality of the displays.

BACKGROUND OF THE INVENTION

Viewing-angle dependence is a known problem in liquid crystal display (LCD). High quality image can only be obtained within a narrow range of viewing angle along the normal incidence of light. This angular dependence of viewing is caused by the phase retardation of light traveling through the LCD device. In addition to liquid crystal cell, a pair of crossed polarizers is typically used in an LCD device to direct light propagation in order to yield dark and bright states. With a proper design light can be eliminated at normal incidence, but light leakage occurs at oblique incidence. Considering only the crossed polarizers, the first polarizer rotates the transmission polarization state of the off-axis light by an angle, while the second polarizer rotates the absorption polarization state by another angle in the opposite direction. This leads to incomplete light extinction by the polarizers in the dark state. Further, the birefringent nature of the liquid crystal (LC) molecules used in the LC cell can also cause phase retardation of the off-axis light, giving rise to light leakage. These deficiencies in the function of the crossed polarizers and the LC cell lead to reduction of contrast ratio and color stability in an LC display.

In order to improve the viewing quality of the display, various wave plates have been developed in the art to compensate the phase retardation caused by the components in an LCD device. These wave plates can be either uniaxial or biaxial optical films. The uniaxial optical film has only one optic axis—commonly being referred to as c-axis or extraordinary axis. If the c-axis lies in the direction normal to the film surface, the wave plate is called C-plate. If the c-axis is parallel to the film surface, it is called A-plate. In a uniaxial wave plate, the refractive index along the c-axis (extraordinary index, $n_e$) is either the highest or the lowest, while all other possible axes perpendicular to the c-axis have the same associated refractive index (ordinary index, $n_o$). If $n_e > n_o$, the C- and A-plates are named positive C- and A-plates respectively, whereas if $n_e < n_o$, they are negative C- and A-plates. Accordingly, the uniaxial wave plates would satisfy the following relationships:

positive C-plate: $n_z > n_x = n_y$
negative C-plate: $n_z < n_x = n_y$
positive A-plate: $n_x > n_y = n_z$
negative A-plate: $n_x < n_y = n_z$ wherein, $n_x$ and $n_y$ represent in-plane refractive indices, and $n_z$ the thickness refractive index.

If a wave plate has an axis associated with the highest or the lowest refractive index and the axes perpendicular to it have associated refractive indexes differ from one another, the wave plate is said to be optically biaxial. The biaxial wave plate has two optic axes, and it has the relation of $n_x \neq n_y \neq n_z$. Let the in-plane index, $n_x$, be the highest or the lowest value, then there exits four types of biaxial wave plates having refractive index profiles of $n_x > n_y > n_z$, $n_x > n_z > n_y$, $n_x < n_y < n_z$, and $n_x < n_z < n_y$, respectively. A wave plate satisfying the equation of $n_x > n_y > n_z$ would have positive in-plane retardation value ($R_{in}$) and negative thickness-direction retardation value ($R_{th}$), whereas the one satisfying $n_x < n_y < n_z$ would have negative $R_{in}$ and positive $R_{th}$.

Negative C-plate is typically used to compensate TN-LCD (LCD having twisted nematic mode of LC cell) and VA-LCD (LCD having vertically aligned mode of LC cell). In the dark state, the rod-like LC molecules in these two modes are aligned in a homeotropic fashion (normal to the film surface). As a result, the LC cell functions as a positive C-plate in the dark state and thus require a negative C-plate to compensate for phase retardation. As for the positive C-plate, it is often used in combination with positive A-plate to compensate IPS-LCD (LCD having in-plane switching mode of LC cell) for phase retardation arising from the crossed polarizers, the protective TAC (triacetylcellulose) films, and the LC cell.

Negative A-plate may be used in combination with positive A-plate to compensate the angle-dependent characteristic of the crossed polarizers as disclosed in US Patent Application No. 2006/0292372. It can also be used in combination with various A and C plates for the total compensation of the display. Negative A-plate is particularly useful for the compensation of IPS-LCD since the LC cell of which may have a refractive index profile of $n_x > n_y = n_z$, which is essentially a positive A-plate.

Biaxial wave plates are of interest because they are capable of compensating both in-plane retardation and thickness-direction retardation. Biaxial optical films with various refractive index profiles may be designed to meet the need for specific $R_{in}$ and $R_{th}$ compensations in an LCD device.

Among the various types of the compensation plates described above, negative C- and positive A-plates are better known in the art. Polymer films based on polyimide are commonly used for negative C-plate, while stretched films based on polycarbonate or norbornene resin are being used for positive A-plate.

On the contrary, positive C- and negative A-plates are lesser known due to their difficulty in fabrication to achieve the desired refractive index profiles. Various solution-cast polymer films suitable for positive C-plate application have been disclosed in our U.S. patent application Ser. Nos. 11/731,142; 11/731,284; 11/731,285; 11/731,366; and 11/731,367 filed Mar. 29, 2007, the entirety of which is incorporated herein by reference.

US Patent Application No. 2006/0292372 discloses compositions of negative A-plate based on surface active polycyclic compounds.

U.S. Pat. No. 5,189,538 disclosed uniaxially stretching of a solution-cast polystyrene film. The polystyrene film cast from a solution was subject to longitudinal uniaxial stretching at a stretch ratio of 100% at 120° C. After stretching, the refractive indices were found to change from ($\eta_{TH}$ 1.551, $\eta_{MD}$ 1.548, $\eta_{TD}$ 1.548) to ($\eta_{TH}$ 1.553, $\eta_{MD}$ 1.556, $\eta_{TD}$ 1.539), wherein $\eta_{TH}$ is a refractive index in the thickness direction ($n_z$), $\eta_{MD}$ is a refractive index in the stretching (machine) direction ($n_x$), and $\eta_{TD}$ is a refractive index in the transverse (width) direction ($n_y$). Thus, the refractive index profile of the polystyrene film was changed from $n_x=n_y<n_z$ to $n_x>n_z>n_y$ after stretching; among them, the refractive index in the stretching direction ($n_x$) was increased and $n_y$ decreased.

U.S. Pat. No. 6,184,957 disclosed LCD having optical compensatory sheet with negative uniaxial property and an optic axis parallel to the plane of the sheet, wherein the optical compensatory sheet satisfies the conditions of 20 nm≤$(n_x-n_y)$ xd≤1000 nm and 0≤$(n_x-n_z)$xd≤200 nm. This patent also disclosed that the optical compensatory sheets can be prepared by stretching uniaxially polystyrene polymers including, for example, polystyrene, polystyrene copolymers, and polystyrene derivatives. In one example, a polystyrene graft copolymer film having a thickness of 70 μm was prepared. The film was then uniaxially stretched 1.9 times at 115° C. The stretched film was reported to have a value of $(n_x-n_y)$×d=122 nm. This prior art further disclosed that polymers having negative intrinsic birefringence were suitable for such application; however, it made no differentiation among those polymers in terms of optical properties. Nor did it teach a method for the preparation of polymer films with a refractive index profile of $n_x<n_y=n_z$ that exhibit an exceptionally high in-plane birefringence.

U.S. Pat. No. 7,215,839 discloses biaxial film compositions having the refractive profile of $n_x>n_z>n_y$ based on stretched polynorbornene film. A heat-shrinkable polymer is required for stretching with the polynorbornene to align the film in the thickness direction in order to raise the value of $n_z$ over $n_y$. U.S. Pat. No. 6,115,095 discloses a compensation layer composed of biaxial birefringence medium having the greatest principal indices of refraction perpendicular to an LCD substrate; no chemical composition of the biaxial medium is given.

SUMMARY OF THE INVENTION

The present invention provides a uniaxially stretched polymer film having a refractive index profile of $n_x<n_y\leq n_z$, which satisfies the relation of $n_y-n_x>0.001$, wherein $n_x$ is the in-plane refractive index parallel to the film stretching direction, $n_y$ is the in-plane refractive index perpendicular to $n_x$, and $n_z$ is the thickness refractive index, where the film is made from a polymer capable of being solution cast into a positive C plate with a refractive index profile of $n_x=n_y<n_z$ and the relation of $n_z-(n_x+n_y)/2>$ about 0.002. The film prior to stretching is preferably prepared by solution casting or melt extrusion or by any other film forming technique known in the art.

Preferably, the polymer film has a refractive index profile of $n_x<n_y=n_z$ which satisfies the relation of $n_y-n_x>0.001$, more preferably $n_y-n_x>0.002$, >0.003, >0.004, >0.005, >0.006, >0.007, >0.008, >0.009, >0.010, >0.012, >0.015, >0.017, >0.02, >0.03, >0.04, >0.05, >0.06, >0.07, >0.08, >0.09, or >0.1.

Preferably, the polymer film has a refractive index profile of $n_x<n_y=n_z$, and $n_y-n_x$ in the range of about 0.001 to about 0.002, 0.003, 0.004, 0.005, 0.006, 0.007, 0.008, 0.009, 0.010, 0.012, 0.015, 0.017, 0.02, 0.03, 0.04, 0.05, 0.08, or 0.1; or in the range of about 0.002 to about 0.003, 0.004, 0.005, 0.006, 0.007, 0.008, 0.009, 0.010, 0.012, 0.015, 0.017, 0.02, 0.03, 0.04, 0.05, 0.08, or 0.1; or in the range of about 0.003 to about 0.004, 0.005, 0.006, 0.007, 0.008, 0.009, 0.010, 0.012, 0.015, 0.017, 0.02, 0.03, 0.04, 0.05, 0.08, or 0.1.

In a preferred embodiment, the polymer film is a free standing film and has a refractive index profile of $n_x<n_y=n_z$, and $n_y-n_x$ in the range of about 0.001 to about 0.002, 0.003, 0.004, 0.005, 0.01, 0.02, 0.03, 0.04, or 0.05; or in the range of about 0.002 to about 0.003, 0.004, 0.005, 0.01, 0.02, 0.03, 0.04, or 0.05; or in the range of about 0.003 to about 0.004, 0.005, 0.01, 0.02, 0.03, 0.04, or 0.05.

In another preferred embodiment, the polymer film is a coating deposited on a substrate and has a refractive index profile of $n_x<n_y=n_z$, and $n_y-n_x$ in the range of about 0.003 to about 0.01, 0.02, 0.03, 0.04, 0.05, 0.06, 0.08 or 0.1; or in the range of about 0.005 to about 0.01, 0.02, 0.03, 0.04, 0.05, 0.06, 0.08 or 0.1; or in the range of about 0.01 to about 0.02, 0.03, 0.04, 0.05, 0.06, 0.08 or 0.1; or in the range of 0.02 to about 0.03, 0.04, 0.05, 0.06, 0.08 or 0.1. Preferably, the stretching is applied to coating and substrate together.

In one embodiment, the polymer film is prepared by uniaxially stretching a polymer film having a positive birefringence, which satisfies the relations of $n_z>n_x=n_y$ and $n_z-(n_x+n_y)/2>$ about 0.002, preferably $n_z-(n_x+n_y)/2>$ about 0.003, more preferably $n_z-(n_x+n_y)/2>$ about 0.005, wherein $n_x$ and $n_y$ represent in-plane refractive indices, and $n_z$ is the thickness refractive index.

The extension ratio of the stretched polymer film (defined as the percentage of the length that is longer than the unstretched film) can be in the range of about 2% to about 200%. The preferred extension ratio of the stretched polymer film can be in any subrange within the above range, e.g., about 5% to about 10%, about 10% to about 20%, about 20% to about 30%, about 30% to about 50%, about 50% to about 100%, about 100% to about 150%, and so on.

In a preferred embodiment, the extension ratio of the stretched polymer film is from about 2% to about 10%, 30%, 50%, 80%, or 100%, and the stretched polymer film has a refractive index profile of $n_x<n_y=n_z$, and $n_y-n_x$ in the range of about 0.001, 0.002, 0.003, 0.004, 0.005, 0.006, 0.007, 0.008, 0.009, 0.010, 0.012, 0.015, 0.017, 0.02, 0.03, 0.05, 0.06, 0.07, 0.08, or 0.09 to about 0.1.

In another preferred embodiment, the extension ratio of the stretched polymer film is from about 2% to about 10%, 30%, 50%, 80%, or 100%, and the stretched polymer film has a refractive index profile of $n_x<n_y=n_z$, and $n_y-n_x$ in the range of about 0.001, 0.002, 0.003, 0.004, 0.005, 0.006, 0.007, 0.008, 0.009, 0.010, 0.012, 0.015, 0.017, 0.02, or 0.03 to about 0.05.

In still another preferred embodiment, the extension ratio of the stretched polymer film is from about 2% to about 100%, 150%, or 200%, and the stretched polymer film has a refractive index profile of $n_x<n_y=n_z$, and $n_y-n_x$ in the range of about 0.001, 0.002, 0.003, 0.004, 0.005, 0.006, 0.007, 0.008, 0.009, 0.010, 0.012, 0.015, 0.017, 0.02, 0.03, 0.05, 0.06, 0.07, 0.08, or 0.09 to about 0.1.

In still another preferred embodiment, the extension ratio of the stretched polymer film is from about 2% to 100%, 150%, or 200%, and the stretched polymer film has a refractive index profile of $n_x<n_y=n_z$, and $n_y-n_x$ in the range of about 0.001, 0.002, 0.003, 0.004, 0.005, 0.006, 0.007, 0.008, 0.009, 0.010, 0.012, 0.015, 0.017, 0.02, or 0.03 to about 0.05.

In one embodiment, the unstretched polymer film is prepared by solution cast of a solution comprising a polymer having a moiety of

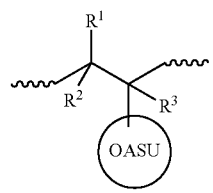

wherein $R_1$, $R_2$, and $R_3$ are each independently hydrogen atoms, alkyl groups, substituted alkyl groups, or halogens, wherein OASU is an optically anisotropic sub-unit that is a substituted aromatic group, a disk-like group, or a mesogen, and wherein OASU is attached to the polymer backbone through a single covalent bond.

Preferably, the polymer is selected from the group consisting of poly(nitrostyrene), poly(bromostyrene), poly(iodostyrene), poly(4-methylstyrene-co-nitrostyene), poly(cyanostyrene), poly(vinylbiphenyl), poly(N-vinyl-4-tert-butylphthalimide), poly(2-vinylnaphthalene), poly[2,5-bis(p-alkoxyphenyl)styrene], and poly{2,5-bis[5-(4-alkoxyphenyl)-1,3,4-oxadiazole]styrene}.

More preferably, the polymer is poly(nitrostyrene) or poly(bromostyrene).

In another embodiment, the polymer film has a refractive index profile of $n_x < n_y < n_z$, which satisfies the relations of $n_y - n_x > 0.002$ and $n_z - (n_x + n_y)/2 >$ about 0.001. Preferably, the film is prepared by uniaxially stretching a polymer film having a positive birefringence, which satisfies the relations of $n_z > n_x = n_y$ and $n_z - (n_x + n_y)/2 >$ about 0.001, greater than 0.002, or greater than 0.003, wherein $n_x$ and $n_y$ represent in-plane refractive indices, and $n_z$ is the thickness refractive index.

In another embodiment, the polymer film has a refractive index profile of $n_x < n_y < n_z$, which satisfies the relations of $n_y - n_x > 0.003$ and $n_z - (n_x + n_y)/2 > 0.0015$, $n_y - n_x > 0.004$ and $n_z - (n_x + n_y)/2 > 0.002$, $n_y - n_x > 0.010$, 0.015, or 0.018 and $n_z - (n_x + n_y)/2 > 0.01$, or $n_y - n_x > 0.02$, 0.03 or 0.04 and $n_z - (n_x + n_y)/2 > 0.02$.

In another embodiment, the polymer film has a refractive index profile of $n_x < n_y < n_z$, and $n_y - n_x$ in the range of about 0.002 to about 0.003, 0.004, 0.005, 0.006, 0.007, 0.008, 0.009, 0.010, 0.012, 0.015, 0.017, 0.02, 0.03, 0.04, 0.05, 0.06, 0.07, 0.08, 0.09, or 0.1, and $n_z - (n_x + n_y)/2$ in the range of about 0.001 to about 0.005, 0.010, 0.015, 0.020, 0.025, 0.03, 0.035, 0.04, 0.045 or 0.05.

In still another embodiment, the extension ratio of the stretched polymer film is from about 2% to about 10%, 30%, 50%, 80%, or 100%, and the stretched polymer film has a refractive index profile of $n_x < n_y < n_z$, which satisfies the relations of $n_y - n_x$ from about 0.002, 0.003, 0.004, 0.005, 0.006, 0.007, 0.008, 0.009, 0.010, 0.012, 0.015, 0.017, 0.02, 0.03, 0.05, 0.06, 0.07, 0.08, or 0.09 to about 0.1, and $n_z - (n_x + n_y)/2$ from about 0.001 to about 0.05.

In still another embodiment, the extension ratio of the stretched polymer film is from about 2% to about 10%, 30%, 50%, 80%, or 100%, and the stretched polymer film has a refractive index profile of $n_x < n_y < n_z$, which satisfies the relations of $n_y - n_x$ from about 0.002, 0.003, 0.004, 0.005, 0.006, 0.007, 0.008, 0.009, 0.010, 0.012, 0.015, 0.017, 0.02, 0.03, 0.05, and $n_z - (n_x + n_y)/2$ from about 0.001 to about 0.025.

In still another embodiment, the extension ratio of the stretched polymer film is from about 2% to 100%, 150%, or 200%, and the stretched polymer film has a refractive index profile of $n_x < n_y < n_z$, which satisfies the relations of $n_y - n_x$ from about 0.002, 0.003, 0.004, 0.005, 0.006, 0.007, 0.008, 0.009, 0.010, 0.012, 0.015, 0.017, 0.02, 0.03, 0.05, 0.06, 0.07, 0.08, or 0.09 to about 0.1, and $n_z - (n_x + n_y)/2$ from about 0.001 to about 0.05.

In still another embodiment, the extension ratio of the stretched polymer film is from about 2% to 100%, 150%, or 200%, and the stretched polymer film has a refractive index profile of $n_x < n_y < n_z$, which satisfies the relations of $n_y - n_x$ from about 0.002, 0.003, 0.004, 0.005, 0.006, 0.007, 0.008, 0.009, 0.010, 0.012, 0.015, 0.017, 0.02, 0.03, 0.05, and $n_z - (n_x + n_y)/2$ from about 0.001 to about 0.025.

Preferably, the unstretched polymer film is prepared by solution cast of a solution comprising a polymer having a moiety of

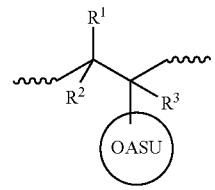

wherein $R_1$, $R_2$, and $R_3$ are each independently hydrogen atoms, alkyl groups, substituted alkyl groups, or halogens, wherein OASU is an optically anisotropic sub-unit that is a substituted aromatic group, a disk-like group, or a mesogen, and wherein OASU is attached to the polymer backbone through a single covalent bond.

Preferably, the polymer is selected from the group consisting of poly(nitrostyrene), poly(bromostyrene), poly(iodostyrene), poly(4-methylstyrene-co-nitrostyene), poly(cyanostyrene), poly(vinylbiphenyl), poly(N-vinyl-4-tert-butylphthalimide), poly(2-vinylnaphthalene), poly[2,5-bis(p-alkoxyphenyl)styrene], and poly{2,5-bis[5-(4-alkoxyphenyl)-1,3,4-oxadiazole]styrene}.

More preferably, the polymer is poly(bromostyrene).

The invention also provides a method for the preparation of a negative A-plate for retardation compensation of an LCD device, which comprises the steps of (a) preparing a polymer solution, which comprises a polymer having a moiety of

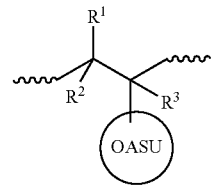

wherein $R_1$, $R_2$, and $R_3$ are each independently hydrogen atoms, alkyl groups, substituted alkyl groups, or halogens, wherein OASU is an optically anisotropic sub-unit that is a substituted aromatic group, a disk-like group, or a mesogen, and wherein OASU is attached to the polymer backbone through a single covalent bond, (b) applying the polymer solution to a substrate and the coating allowed to dry, (c) removing the dried film from the substrate to give a polymer film having a refractive index profile of $n_x = n_y < n_z$ and the relation of $n_z - (n_x + n_y)/2 >$ about 0.002, and (d) uniaxially stretching the resulting polymer film at a suitable temperature to an elongation that is capable of yielding a refractive index profile of $n_x < n_y = n_z$, wherein $n_x$ is the in-plane refractive index parallel to the film stretching direction, $n_y$ is the in-plane refractive index perpendicular to $n_x$, and $n_z$ is the thickness refractive index.

The invention also provides a method for the preparation of a negative A-plate for retardation compensation of an LCD device, which comprises the steps of (a) selecting a polymer resin whose structure comprises a moiety of

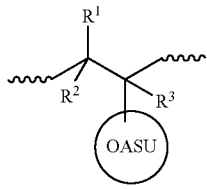

wherein $R_1$, $R_2$, and $R_3$ are each independently hydrogen atoms, alkyl groups, substituted alkyl groups, or halogens, wherein OASU is an optically anisotropic sub-unit that is a substituted aromatic group, a disk-like group, or a mesogen, and wherein OASU is attached to the polymer backbone through a single covalent bond, (b) converting the polymer to a film by melt extrusion or any other film forming technique known in the art, (c) uniaxially stretching the resulting polymer film at a suitable temperature to an elongation that is capable of yielding a refractive index profile of $n_x < n_y = n_z$, wherein $n_x$ is the in-plane refractive index parallel to the film stretching direction, $n_y$ is the in-plane refractive index perpendicular to $n_x$, and $n_z$ is the thickness refractive index.

The invention also provides a method for the preparation of a negative A-plate for retardation compensation of an LCD device, which comprises the steps of i. preparing a polymer solution, which comprises a polymer having a moiety of

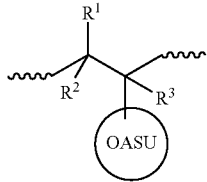

wherein $R_1$, $R_2$, and $R_3$ are each independently hydrogen atoms, alkyl groups, substituted alkyl groups, or halogens, wherein OASU is an optically anisotropic sub-unit that is a substituted aromatic group, a disk-like group, or a mesogen, and wherein OASU is attached to the polymer backbone through a single covalent bond, ii. applying the polymer solution to a substrate to form a coating on the substrate, iii. uniaxially stretching the coating and the substrate at a suitable temperature to an elongation that is capable of yielding a refractive index profile for the coating layer of $n_x < n_y = n_z$, wherein $n_x$ is the in-plane refractive index parallel to the film stretching direction, $n_y$ is the in-plane refractive index perpendicular to $n_x$, and $n_z$ is the thickness refractive index.

The invention also provides a method for the preparation of a biaxial birefringent plate for retardation compensation of an LCD device, which comprises the steps of (a) preparing a polymer solution, which comprises a polymer having a moiety of

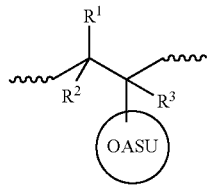

wherein $R_1$, $R_2$, and $R_3$ are each independently hydrogen atoms, alkyl groups, substituted alkyl groups, or halogens, wherein OASU is an optically anisotropic sub-unit that is a substituted aromatic group, a disk-like group, or a mesogen, and wherein OASU is attached to the polymer backbone through a single covalent bond, (b) applying the polymer solution to a substrate and the coating allowed to dry, (c) removing the dried film from the substrate to give a polymer film having a refractive index profile of $n_x = n_y < n_z$ and the relation of $n_z - (n_x + n_y)/2 >$ about 0.002, and (d) uniaxially stretching the resulting polymer film at a suitable temperature to an elongation that is capable of yielding a refractive index profile of $n_x < n_y < n_z$, wherein $n_x$ is the in-plane refractive index parallel to the film stretching direction, $n_y$ is the in-plane refractive index perpendicular to $n_x$, and $n_z$ is the thickness refractive index.

In yet another embodiment, this invention provides a method for the preparation of a biaxial birefringent plate for retardation compensation of an LCD device, which comprises the steps of i. preparing a polymer solution, which comprises a polymer having a moiety of

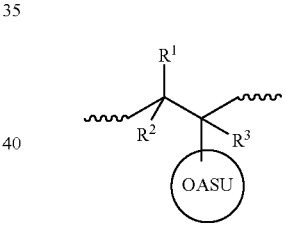

wherein $R_1$, $R_2$, and $R_3$ are each independently hydrogen atoms, alkyl groups, substituted alkyl groups, or halogens, wherein OASU is an optically anisotropic sub-unit that is a substituted aromatic group, a disk-like group, or a mesogen, and wherein OASU is attached to the polymer backbone through a single covalent bond, ii. applying the polymer solution to a substrate to form a coating on the substrate, iii. uniaxially stretching the coating and the substrate at a suitable temperature to an elongation that is capable of yielding a refractive index profile for the coating layer of $n_x < n_y < n_z$, wherein $n_x$ is the in-plane refractive index parallel to the film stretching direction, $n_y$ is the in-plane refractive index perpendicular to $n_x$, and $n_z$ is the thickness refractive index.

In preferred embodiments, the polymer film is stretched to an extension ratio of about 2-200%, 2-100%, 2-50%, or 2-30%.

The invention also provides a uniaxially stretched polymer film prepared according to any of the above-described methods.

DETAILED DESCRIPTION OF THE INVENTION

The present invention provides a uniaxially stretched polymer film having a refractive index profile of $n_x<n_y \le n_z$ and an exceptionally high value of in-plane birefringence, $n_y-n_x$, that can be obtained by uniaxially stretching of a polymer film, where the film is prepared from a polymer capable of being solution cast into a positive C plate with a refractive index profile of $n_x=n_y<n_z$ and the relation of $n_z-(n_x+n_y)/2>$ about 0.002. During stretching the refractive index in the stretching direction ($n_x$) is decreased and $n_y$ (the in-plane refractive index perpendicular to $n_x$) is increased after stretching; $n_z$ is the thickness-direction refractive index.

The high value of ($n_y-n_x$) is desirable because a thinner film can be used to achieve the same retardation (R) for phase compensation in accordance with the formula, $R=\Delta n \times d=(n_y-n_x)\times d$, wherein d represents the thickness of the film. The thinner film in turn enables the fabrication of a thinner display.

In one embodiment, the desirable in-plane or out-of-plane birefringence value can be achieved by a low extension ratio of stretching (e.g. 2-30%). This is advantageous in that the stretching process is simplified and the resulting stretched film is less prone to relax back and, thus, exhibits an improved stability. Another advantage of the present invention is that a lower temperature may be employed for stretching to obtain the desirable in-plane and out-of-plane birefringences. While not intended to be bound by any theory, it is hypothesized that the molecular structure required to obtain a solution cast positive C plate with refractive index profile of $n_x=n_y<n_z$ and the relation of $n_z-(n_x+n_y)/2>$ about 0.002 can be easily oriented by stretching into a molecular orientation required for a negative A plate.

In one embodiment of the present invention, there is provided a uniaxially stretched polymer film having a refractive index profile of $n_x<n_y=n_z$, which satisfies the relation of $n_y-n_x>0.002$, wherein $n_x$ is the in-plane refractive index parallel to the film stretching direction, $n_y$ is the in-plane refractive index perpendicular to $n_x$, and $n_z$ is the thickness refractive index. Preferably, $n_y-n_x>0.004$; more preferably, $n_y-n_x>0.005$.

Preferably, the polymer film has a refractive index profile of $n_x<n_y=n_z$, which satisfies the relation of $n_y-n_x>0.002$, more preferably $n_y-n_x>0.003$, >0.004, >0.005, >0.006, >0.007, >0.008, >0.009, >0.010, >0.012, >0.015, >0.017, >0.02, >0.03, >0.04, >0.05, >0.06, >0.07, >0.08, >0.09, or >0.1.

Preferably, the polymer film has a refractive index profile of $n_x<n_y=n_z$, and $n_y-n_x$ in the range of about 0.001 to about 0.002, 0.003, 0.004, 0.005, 0.006, 0.007, 0.008, 0.009, 0.010, 0.012, 0.015, 0.017, 0.02, 0.03, 0.04, 0.05, 0.08, or 0.1; or in the range of about 0.002 to about 0.003, 0.004, 0.005, 0.006, 0.007, 0.008, 0.009, 0.010, 0.012, 0.015, 0.017, 0.02, 0.03, 0.04, 0.05, 0.08, or 0.1; or in the range of about 0.003 to about 0.004, 0.005, 0.006, 0.007, 0.008, 0.009, 0.010, 0.012, 0.015, 0.017, 0.02, 0.03, 0.04, 0.05, 0.08, or 0.1.

In a preferred embodiment, the polymer film is a free standing film and has a refractive index profile of $n_x<n_y=n_z$, and $n_y-n_x$ in the range of about 0.001 to about 0.002, 0.003, 0.004, 0.005, 0.01, 0.02, 0.03, 0.04, or 0.05; or in the range of about 0.002 to about 0.003, 0.004, 0.005, 0.01, 0.02, 0.03, 0.04, or 0.05; or in the range of about 0.003 to about 0.004, 0.005, 0.01, 0.02, 0.03, 0.04, or 0.05.

In another preferred embodiment, the polymer film is a coating deposited on a substrate and has a refractive index profile of $n_x<n_y=n_z$, and $n_y-n_x$ in the range of about 0.003 to about 0.01, 0.02, 0.03, 0.04, 0.05, 0.06, 0.08 or 0.1; or in the range of about 0.005 to about 0.01, 0.02, 0.03, 0.04, 0.05, 0.06, 0.08 or 0.1; or in the range of about 0.01 to about 0.02, 0.03, 0.04, 0.05, 0.06, 0.08 or 0.1; or in the range of 0.02 to about 0.03, 0.04, 0.05, 0.06, 0.08 or 0.1. Preferably, the stretching is applied to coating and substrate together.

In the specification of the present invention, the term "$n_y=n_z$" denotes not only to the case where $n_y$ is exactly equal to $n_z$, but also to a case where they are substantially equal.

In another embodiment, this invention provides a uniaxially stretched polymer film having a refractive index profile of $n_x<n_y<n_z$, which satisfies the relations of $n_y-n_x>0.002$ and $n_z-(n_x+n_y)/2>$ about 0.001, wherein $n_x$ is the in-plane refractive index parallel to the film stretching direction, $n_y$ is the in-plane refractive index perpendicular to $n_x$, and $n_z$ is the thickness refractive index. Preferably, $n_y-n_x>0.003$; more preferably, $n_y-n_x>0.004$. The preferred value for $n_z-(n_x+n_y)/2$ is >0.0015, more preferred >0.002.

In one embodiment, the polymer film is prepared by uniaxially stretching a polymer film having a positive birefringence, which satisfies the relations of $n_z>n_x=n_y$, and $n_z-(n_x+n_y)/2>$ about 0.002, preferably $n_z-(n_x+n_y)/2>$ about 0.003, more preferably $n_z-(n_x+n_y)/2>$ about 0.005, wherein $n_x$ and $n_y$ represent in-plane refractive indices, and $n_z$ is the thickness refractive index.

The extension ratio of the stretched polymer film (defined as the percentage of the length that is longer than the unstretched film) can be in the range of about 2% to about 200%. The preferred extension ratio of the stretched polymer film can be in any subrange within the above range, e.g., about 5% to about 10%, about 10% to about 20%, about 20% to about 30%, about 30% to about 50%, about 50% to about 100%, about 100% to about 150%, and so on.

In a preferred embodiment, the extension ratio of the stretched polymer film is from about 2% to about 5%, and the stretched polymer film has a refractive index profile of $n_x<n_y=n_z$, and $n_y-n_x$ in the range of about 0.001 to about 0.003.

In another preferred embodiment, the extension ratio of the stretched polymer film is from about 2% to about 10% and the stretched polymer film has a refractive index profile of $n_x<n_y=n_z$, and $n_y-n_x$ in the range of about 0.001, 0.002, 0.003, 0.004, 0.005, 0.006, 0.007, 0.008, or 0.009 to about 0.01.

In still another preferred embodiment, the extension ratio of the stretched polymer film is from about 2% to about 25%, and the stretched polymer film has a refractive index profile of $n_x<n_y=n_z$, and $n_y-n_x$ in the range of about 0.001, 0.002, 0.003, 0.004, 0.005, 0.006, 0.007, 0.008, 0.009, 0.010, 0.012, 0.015, 0.017 to about 0.02.

In still another preferred embodiment, the extension ratio of the stretched polymer film is from about 2% to about 40%, and the stretched polymer film has a refractive index profile of $n_x<n_y=n_z$, and $n_y-n_x$ in the range of about 0.001, 0.002, 0.003, 0.004, 0.005, 0.006, 0.007, 0.008, 0.009, 0.010, 0.012, 0.015, 0.017, 0.02 to about 0.025.

In still another preferred embodiment, the extension ratio of the stretched polymer film is from about 2% to about 60%, and the stretched polymer film has a refractive index profile of $n_x<n_y=n_z$, and $n_y-n_x$ in the range of about 0.001, 0.002, 0.003, 0.004, 0.005, 0.006, 0.007, 0.008, 0.009, 0.010, 0.012, 0.015, 0.017, 0.02 to about 0.03.

In still another preferred embodiment, the extension ratio of the stretched polymer film is from about 2% to about 100%, and the stretched polymer film has a refractive index profile of $n_x<n_y=n_z$, and $n_y-n_x$ is in the range of about 0.001, 0.002, 0.003, 0.004, 0.005, 0.006, 0.007, 0.008, 0.009, 0.010, 0.012, 0.015, 0.017, 0.02, 0.03 to about 0.04.

In still another preferred embodiment, the extension ratio of the stretched polymer film is from about 2% to about 120%, and the stretched polymer film has a refractive index profile of $n_x<n_y=n_z$, and $n_y-n_x$ in the range of about 0.001, 0.002, 0.003, 0.004, 0.005, 0.006, 0.007, 0.008, 0.009, 0.010, 0.012, 0.015, 0.017, 0.02, 0.03 to about 0.05.

In still another preferred embodiment, the extension ratio of the stretched polymer film is from about 2% to about 200%, and the stretched polymer film has a refractive index profile of $n_x<n_y=n_z$, and $n_y-n_x$ in the range of about 0.001, 0.002, 0.003, 0.004, 0.005, 0.006, 0.007, 0.008, 0.009, 0.010, 0.012, 0.015, 0.017, 0.02, 0.03 to about 0.1.

In another embodiment, the polymer film has a refractive index profile of $n_x<n_y<n_z$, which satisfies the relations of $n_y-n_x>0.002$ and $n_z-(n_x+n_y)/2>$ about 0.001. Preferably, the film is prepared by uniaxially stretching a polymer film having a positive birefringence, which satisfies the relations of $n_z>n_x=n_y$ and $n_z-(n_x+n_y)/2>$ about 0.001, greater than 0.002, or greater than 0.003, wherein $n_x$ and $n_y$ represent in-plane refractive indices, and $n_z$ is the thickness refractive index.

In another embodiment, the polymer film has a refractive index profile of $n_x<n_y<n_z$, which satisfies the relations of $n_y-n_x>0.003$ and $n_z-(n_x+n_y)/2>0.0015$, $n_y-n_x>0.004$ and $n_z-(n_x+n_y)/2>0.002$, $n_y-n_x>0.010$, 0.015, or 0.018 and $n_z-(n_x+n_y)/2>0.01$, or $n_y-n_x>0.02$, 0.03 or 0.04 and $n_z-(n_x+n_y)/2>0.02$.

In another embodiment, the polymer film has a refractive index profile of $n_x<n_y<n_z$, and $n_y-n_x$ in the range of about 0.002 to about 0.003, 0.004, 0.005, 0.006, 0.007, 0.008, 0.009, 0.010, 0.012, 0.015, 0.017, 0.02, 0.03, 0.04 or 0.05, and $n_z-(n_x+n_y)/2$ in the range of about 0.001 to about 0.015, 0.020, or 0.025.

In still another embodiment, the extension ratio of the stretched polymer film is from about 2% to about 10%, 20%, 50%, or 100%, and the stretched polymer film has a refractive index profile of $n_x<n_y<n_z$, which satisfies the relations of $n_y-n_x$ from about 0.001, 0.002, 0.003, 0.004, 0.005, 0.006, 0.007, 0.008, 0.009, to about 0.010 and $n_z-(n_x+n_y)/2$ from about 0.001 to about 0.01.

In still another embodiment, the extension ratio of the stretched polymer film is from about 2% to about 25%, 50%, or 100%, and the stretched polymer film has a refractive index profile of $n_x<n_y<n_z$, which satisfies the relations of $n_y-n_x$ from about 0.001, 0.002, 0.003, 0.004, 0.005, 0.006, 0.007, 0.008, 0.009, 0.010, 0.012, 0.015, 0.017 to about 0.02 and $n_z-(n_x+n_y)/2$ from about 0.001 to about 0.015.

In still another embodiment, the extension ratio of the stretched polymer film is from about 2% to about 40%, 50%, or 100%, and the stretched polymer film has a refractive index profile of $n_x<n_y<n_z$, which satisfies the relations of $n_y-n_x$ from about 0.001, 0.002, 0.003, 0.004, 0.005, 0.006, 0.007, 0.008, 0.009, 0.010, 0.012, 0.015, 0.017, 0.02, 0.03 to about 0.034 and $n_z-(n_x+n_y)/2$ from about 0.001 to about 0.02.

In still another embodiment, the extension ratio of the stretched polymer film is from about 2% to about 60%, 70%, or 100%, and the stretched polymer film has a refractive index profile of $n_x<n_y<n_z$ which satisfies the relations of $n_y-n_x$ from about 0.001, 0.002, 0.003, 0.004, 0.005, 0.006, 0.007, 0.008, 0.009, 0.010, 0.012, 0.015, 0.017, 0.02, 0.03 to about 0.042 and $n_z-(n_x+n_y)/2$ from about 0.001 to about 0.025.

In still another embodiment, the extension ratio of the stretched polymer film is from about 2% to about 110%, and the stretched polymer film has a refractive index profile of $n_x<n_y<n_z$, which satisfies the relations of $n_y-n_x$ from about 0.001, 0.002, 0.003, 0.004, 0.005, 0.006, 0.007, 0.008, 0.009, 0.010, 0.012, 0.015, 0.017, 0.02, 0.03 to about 0.046 and $n_z-(n_x+n_y)/2$ from about 0.001 to about 0.027. The unstretched polymer film may be prepared by solution cast of a polymer solution comprising a polymer having a moiety of

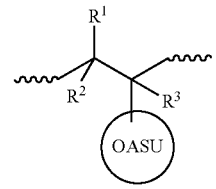

wherein $R_1$, $R_2$, and $R_3$ are each independently hydrogen atoms, alkyl groups, substituted alkyl groups, or halogens, wherein OASU is an optically anisotropic sub-unit that is a substituted aromatic group, a disk-like group, or a mesogen, and wherein OASU is attached to the polymer backbone through a single covalent bond. The polymer can be prepared according to methods described in U.S. patent application Ser. No. 11/731,367, filed Mar. 29, 2007, which is incorporated herein by reference in its entirety. The unstretched film may also be prepared by melt extrusion or any other film forming technique known in the art.

The unstretched polymer film may be prepared by solution cast of a polymer solution comprising a polymer having a moiety of

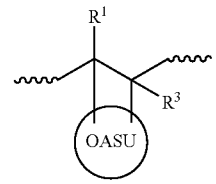

wherein $R^1$, $R^2$, and $R^3$ are each independently hydrogen atoms, alkyl groups, substituted alkyl groups, or halogens, and OASU is an optically anisotropic sub-unit. The covalent bond provides a direct connection between the OASU and the polymer backbone that other atoms are not positioned along the covalent bond, which would make the connection between the OASU and the polymer backbone indirect.

The polymer film may be a homopolymer or a copolymer. The copolymer may have one or more moieties containing an OASU attached directly to the polymer backbone through at least one covalent bond. The description of the invention applies to any OASU-containing homopolymer or copolymer with any combination of moieties. As used herein, the term "polymer" refers to homopolymers and copolymers.

The OASU of the above polymers may be disk-like, rod like (mesogen), or aromatic rings (Ar) substituted with birefringence enhancing substituents (BES). In a preferred embodiment, the OASU is oriented perpendicular to the polymer backbone, and the value of the positive birefringence of the polymer film increases with increasing perpendicularity of the OASUs.

The polymer film may be a homopolymer or copolymer with one or more moieties containing a disk attached directly to the polymer backbone through at least one covalent bond. The copolymer may have a moiety with the general structure in the polymer backbone:

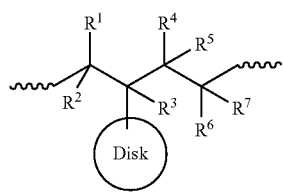

wherein $R^1$, $R^2$, $R^3$, $R^4$, $R^5$, and $R^7$ are each independently hydrogen atoms, alkyl groups, substituted alkyl groups, or halogens; wherein $R^6$ is a hydrogen atom, alkyl group, substituted alkyl group, halogen, ester, amide, ketone, ether, cyano, phenyl, epoxy, urethane, urea, or optically anisotropic subunit (OASU) attached directly to the backbone of a residue of an ethylenically unsaturated monomer. In one embodiment, $R^6$ is a different disk. In another embodiment, $R^6$ is a benzene ring. The disk may also be attached to a copolymer backbone by two covalent bonds.

The disk usually has a size greater than a benzene ring. The disk is usually bulky. In one embodiment, the disk group has a fused ring structure. The "fused ring" structure may be understood to have two or more individual rings that are connected by sharing at least one of their sides. Each individual ring in the fused ring may be substituted or unsubstituted and is preferably a six- or five-membered ring, which may be all-carbon or heterocyclic. Individual rings in a fused ring may be aromatic or aliphatic. Preferred individual rings in a fused ring include, but are not limited to, aromatic rings and substituted aromatic rings, lactam ring and rings based on aromatic imide such as phthalimide and substituted phthalimide. The disk group is stable at ambient conditions and thus suitable for use in an optical compensation film for an LCD.

Representatives and illustrative examples of disk groups include, but are not limited to, naphthalene, anthracene, phenanthrene, naphtacene, pyrene, pentacene, phthalimide, and the like as shown in the following chemical structures:

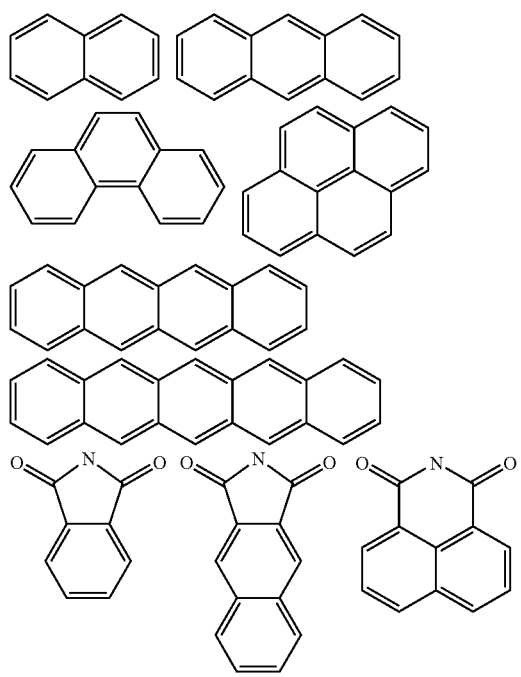

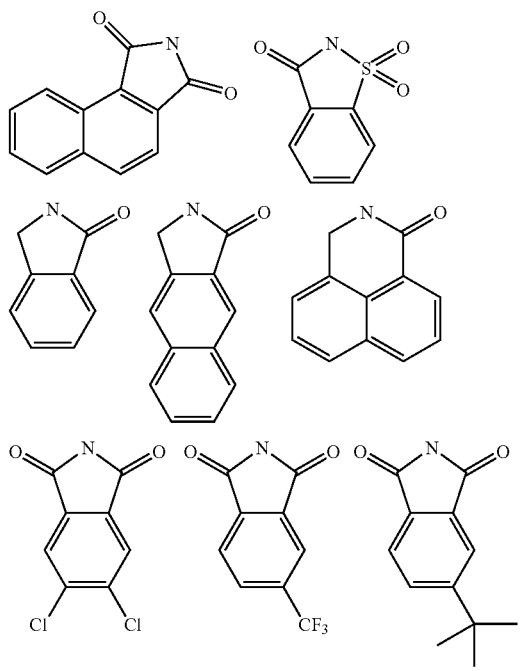

As one skilled in the art will recognize, polymer compositions comprising moieties with disk groups may be prepared by polymerization of a disk-containing monomer having a vinyl group attached directly to either a carbon or a nitrogen atom on the fused ring. Such disk-containing monomers with polymerizable vinyl groups include, but are not limited to, the following compounds:

-continued

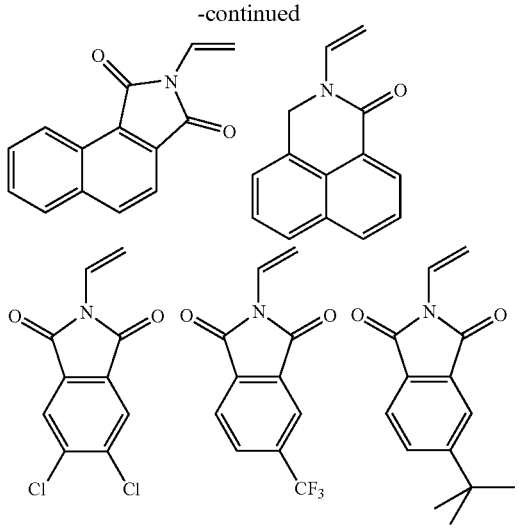

Polymer compositions comprising moieties with disk groups may also be prepared by copolymerization of a disk-containing monomer with one or more ethylenically unsaturated monomers. Such ethylenically unsaturated monomers that may be used to copolymerize with disk-containing monomers include, but are not limited to, one or more of methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethyolpropyl triacrylate, styrene, α-methyl styrene, nitrostyrene, bromostyrene, iodostyrene, cyanostyrene, chlorostyrene, 4-t-butylstyrene, 4-methylstyrene, vinyl biphenyl, vinyl triphenyl, vinyl toluene, chloromethyl styrene, acrylic acid, methacrylic acid, itaconic acid, crotonic acid, maleic anhydride, glycidyl methacrylate, carbodiimide methacrylate, $C_1$-$C_{18}$ alkyl crotonates, di-n-butyl maleate, di-octylmaleate, allyl methacrylate, di-allyl maleate, di-allylmalonate, methyoxybutenyl methacrylate, isobornyl methacrylate, hydroxybutenyl methacrylate, hydroxyethyl(meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl (meth)acrylate, methacrylamide, acrylamide, butyl acrylamide, ethyl acrylamide, diacetoneacrylamide, butadiene, vinyl ester monomers, vinyl(meth)acrylates, isopropenyl (meth)acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylamino ethyl methacrylate, N,N-dimethylaminoethyl acrylate, N-(2-methacryloyloxy-ethyl)ethylene urea, and methacrylamido-ethyl-ethylene urea. Further monomers are described in The Brandon Associates, 2nd edition, 1992 Merrimack, N. H., and in Polymers and Monomers, the 1966-1997 Catalog from Polyscience, Inc., Warrington, Pa., U.S.A.

Polymerization may be carried out by a method known in the art such as bulk, solution, emulsion, or suspension polymerization. The reaction may be free radical, cationic, anionic, zwitterionic, Ziegler-Natta, or atom transfer radical type of polymerization. Emulsion polymerization is a preferred method of polymerization when a particularly high molecular weight is desirable. A high molecular weight polymer may lead to better film quality and higher positive birefringence.

Solution film casting may be done with disk containing polymer, a polymer solution comprising a blend of disk-containing polymer with other polymers, or a copolymer of disk-containing monomer with other monomers, the latter two being advantageous because they may improve film quality and lower cost. Polymer solutions may further contain other ingredients such as other polymers or additives.

Depending on the particular disk structure and polymer or polymer blend composition, the disk-containing polymers may be soluble in, for example, toluene, methyl isobutyl ketone (MIBK), methyl ethyl ketone (MEK), cyclopentanone, N,N-dimethylformamide, or mixtures thereof. Preferred solvents are toluene and MIBK.

In another embodiment of the invention, the OASU is an aromatic ring (Ar) substituted with birefringence enhancing substituents (BES). BES could also be substituents on disk or mesogen OASUs. The Ar-BES may also be a fused aromatic ring substituted with BES. The Ar-BES may be attached directly to the polymer backbone through one covalent bond so the moiety has the general formula:

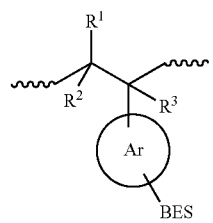

in the polymer backbone, wherein $R^1$, $R^2$, and $R^3$ are each independently hydrogen atoms, alkyl groups, substituted alkyl groups, or halogens. The Ar-BES may also be attached directly to the polymer backbone through two independent covalent bonds. The degree of substitution of the aromatic ring with BES is at least 0.1, but it may also be higher. The covalent bond may be a carbon-carbon or carbon-nitrogen bond. The Ar-BES containing polymer has a positive birefringence greater than 0.002 throughout the wavelength range of 400 nm<λ<800 nm without being subject to heat treatment, photo irradiation, or stretching. The Ar-BES-containing polymer film may be made by solution casting, and may form an out-of-plane anisotropic alignment upon solvent evaporation. The Ar-BES preferably has a positive birefringence greater than 0.005, and more preferably has a positive birefringence greater than 0.01 throughout the wavelength range of 400 nm<λ<800 nm.

The polymer film may be a homopolymer or copolymer with one or more moieties containing an Ar-BES attached directly to the polymer backbone through one covalent bond. The copolymer may have a moiety with the general structure in the polymer backbone:

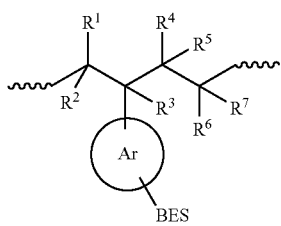

wherein $R^1$, $R^2$, $R^3$, $R^4$, $R^5$, and $R^7$ are each independently hydrogen atoms, alkyl groups, substituted alkyl groups, or halogens; wherein $R^6$ is a hydrogen atom, alkyl group, substituted alkyl group, halogen, ester, amide, ketone, ether, cyano, phenyl, epoxy, urethane, urea, or optically anisotropic subunit (OASU) attached directly to the backbone of the residue of an ethylenically unsaturated monomer. In one embodiment, $R^6$ is a different Ar-BES. In another embodiment, $R^6$ is a benzene ring.

The degree of substitution (DS) of BES on the aromatic ring refers to the average number of BES on one aromatic ring in a polymer composition. Thus, DS=1 when, on average, each aromatic ring is substituted with one BES. DS may also be greater than one when, on average, each aromatic ring is substituted with more than one BES. DS is preferably greater than 0.3, more preferably greater than 0.5, and most preferably greater than 0.7. The DS of BES is directly related to the polymer's birefringence. Thus, Δn may be manipulated by varying the DS. The solubility of the polymer can also dependent on the DS and be optimized accordingly. The DS can be readily manipulated by one of ordinary skill in the art, for example, by adjusting the starting amounts of BES.

In one embodiment, the Ar-BES-containing polymer is a poly(vinylaromatic), i.e. a polymer resulting from polymerization of the vinyl group on an aromatic ring. The poly(vinylaromatic) also has at least one BES. Poly(vinylaromatic) with BES advantageously exhibits exceptionally high birefringence values, is soluble in a variety of organic solvents, and may be used to prepare an optical compensation film by solution casting onto a substrate. The solubility and birefringence of poly(vinyl aromatics) of the invention can be controlled by incorporating certain BESs and by adjusting their degree of substitutions (DSs) of the aromatic rings of the polymers. This is highly desirable since an LCD device typically contains multi-layers of materials having different solubility in a variety of solvents and a layer can only be coated with a polymer solution that does not dissolve this specific layer. Thus, the ability to control the solubility and birefringence of a polymer allows the optical film of the present invention to be cast on a specific layer (or substrate) for LCD fabrication to achieve the desirable order of the layers in the device.

Representatives and illustrative examples of aromatic groups include, but are not limited to, benzene, biphenyl, naphthalene, anthracene, phenanthrene, naphthacene, pyrene, pentacene, triphenyl, and the like. Preferably, the aromatic ring is benzene, biphenyl or naphthalene. Most preferably, the aromatic ring is benzene.

BES is a group that in general is bulky and/or capable of increasing the polarizability of the disk groups' aromatic ring on poly(vinyl aromatic). A polymer may contain different BES groups on different aromatic rings within the same polymer molecule or different BES groups on the same aromatic ring. Representatives and illustrative examples of BES include, but are not limited to, $NO_2$, Br, I, CN, and phenyl. Preferably, BES substituents are $NO_2$, Br, I, and CN. Most preferably, BES is $NO_2$ or Br.

BES may be attached to an aromatic ring such as benzene at any available position including the positions that are para, ortho or meta to the ethylene moiety. A polymer composition may also have BESs that are in different positions on different aromatic rings. In a preferred embodiment, the BES is para to the ethylene moiety. BES may also be mostly at the para position with some BES at the ortho and/or meta positions.

Representatives and illustrative examples of polymer compositions of BES-substituted aromatic polymers include, but are not limited to, poly(nitrostyrene), poly(bromostyrene), substituted poly(nitrostyrene), substituted poly(bromostyrene), copolymers of nitrostyrene or bromostyrene, and copolymer of substituted nitrostyrene or bromostyrene.

In another example embodiment of the invention, the OASU is rod-like. In a preferred embodiment, the rod-like structure is a mesogen. The mesogen may be attached directly to the polymer backbone through one covalent bond (without a spacer) so the moiety has the general formula:

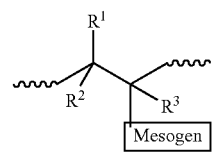

in the polymer backbone, wherein $R^1$, $R^2$, and $R^3$ are each independently hydrogen atoms, alkyl groups, substituted alkyl groups, or halogens. The mesogen may also be attached directly to the polymer backbone through two independent covalent bonds. The covalent bond may be a carbon-carbon or carbon-nitrogen bond. The mesogen is attached to the polymer backbone preferably at the gravity center of the mesogen or a nearby position, but may also be attached at an end or off-center position. The mesogen-containing polymer has a positive birefringence greater than 0.002 throughout the wavelength range of 400 nm<λ<800 nm without being subject to heat treatment, photo irradiation, or stretching. The mesogen-containing polymer film may be made by solution casting and may form an out-of-plane anisotropic alignment upon solvent evaporation. In a preferred embodiment, the positive birefringence is greater than 0.005, greater than 0.01, greater than 0.02 or greater than 0.03 throughout the wavelength range of 400 nm<λ<800 nm. The mesogen-containing polymers in the present invention are commonly referred to as mesogen jacketed polymers (MJPs). MJPs according to the invention include conventional mesogen-jacketed liquid crystalline polymers (MJLCPs) as well as polymers that are jacketed by a non-liquid crystalline rod-like group.

The polymer film may be a homopolymer or copolymer with one or more moieties containing a mesogen attached directly to the polymer backbone through at least one covalent bond. The copolymer may have a moiety with the general structure in the polymer backbone:

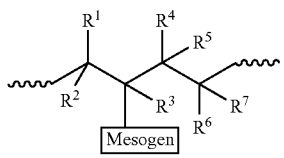

wherein $R^1$, $R^2$, $R^3$, $R^4$, $R^5$, and $R^7$ are each independently hydrogen atoms, alkyl groups, substituted alkyl groups, or halogens; wherein $R^6$ is a hydrogen atom, alkyl group, substituted alkyl group, halogen, ester, amide, ketone, ether, cyano, phenyl, epoxy, urethane, urea, or optically anisotropic subunit (OASU) attached directly to the backbone of the residue of an ethylenically unsaturated monomer. In one embodiment, $R^6$ is a different mesogen. The mesogen may also be attached to a copolymer backbone by two covalent bonds.

Mesogens of the invention may have the general formula:

$$R^1\text{-}(A^1\text{-}Z^1)_m\text{-}A^2\text{-}(Z^2\text{-}A^3)_n\text{-}R^2$$

wherein,
$A^1$, $A^2$, and $A^3$ are independently either aromatic or cycloaliphatic rings. The rings may be all carbons or heterocyclic and may be unsubstituted or mono- or poly-substituted with halogen, cyano or nitro, or alkyl, alkoxy, or alkanoyl groups having 1 to 8 carbon atoms,
$Z^1$, $Z^2$, and $Z^3$ are each independently —COO—, —OOC—, —CO—, —CONH—, —NHCO—, —CH=CH—, —C≡C—, —CH=N—, —N=CH—, —N=N—, —O—, —S—, or a single bond,
$R^1$ and $R^2$ are each independently halogen, cyano, or nitro groups, or alkyl, alkoxy, or alkanoyl groups having 1 to 25 carbon atoms, or has one of the meanings given for —($Z^2$-$A^3$),
m is 0, 1, or 2; n is 1 or 2. Preferably, m is 1 or 2; n is 1 or 2; $A^2$ is 1,4-phenylene; and the mesogen is attached to the polymer backbone through $A^2$. More preferably, m is 2; n is 2; $A^2$ is 1,4-phenylene; and the mesogen is attached to the polymer backbone through $A^2$.

Representatives and illustrative examples of aromatic rings in a mesogen include, but are not limited to:

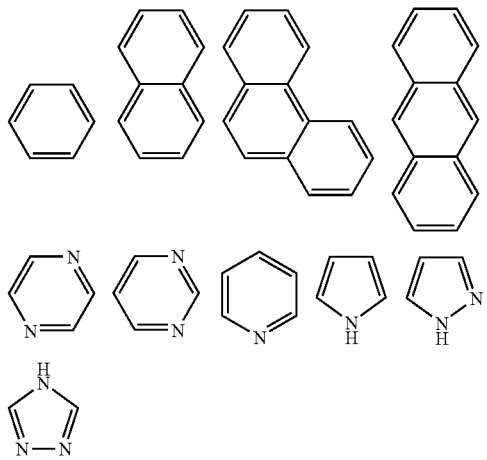

Representatives and illustrative examples of cycloaliphatic rings in a mesogen include, but are not limited to:

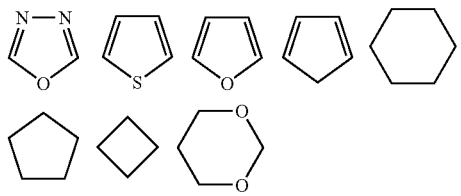

Representatives and illustrative examples of mesogens that may be attached to the polymer backbone through one covalent bond include, but are not limited to:

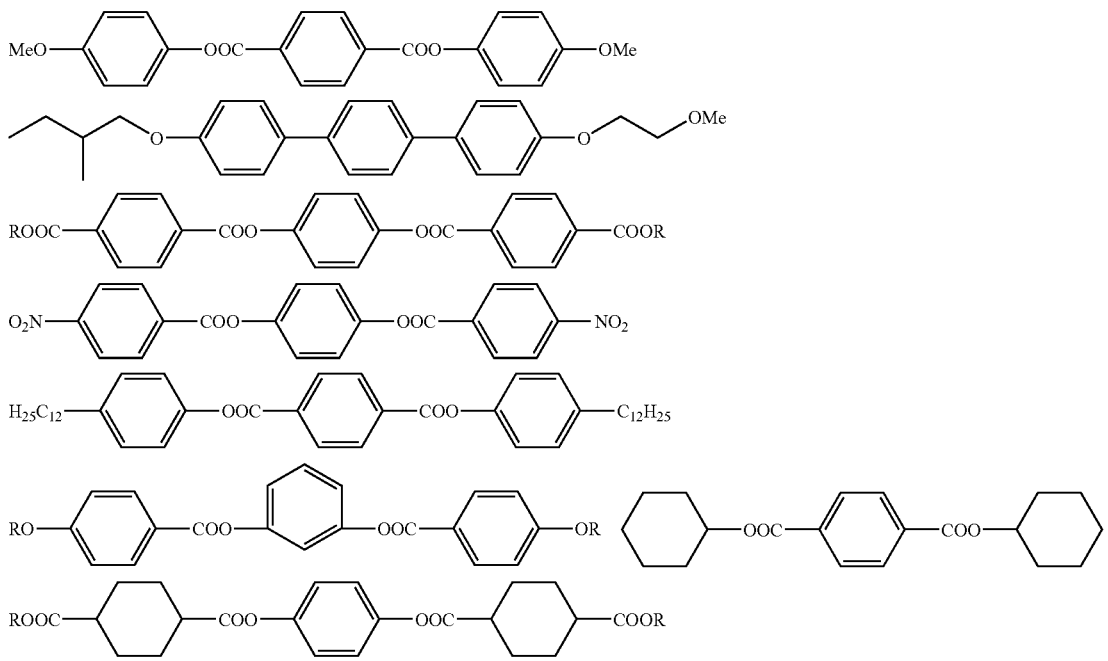

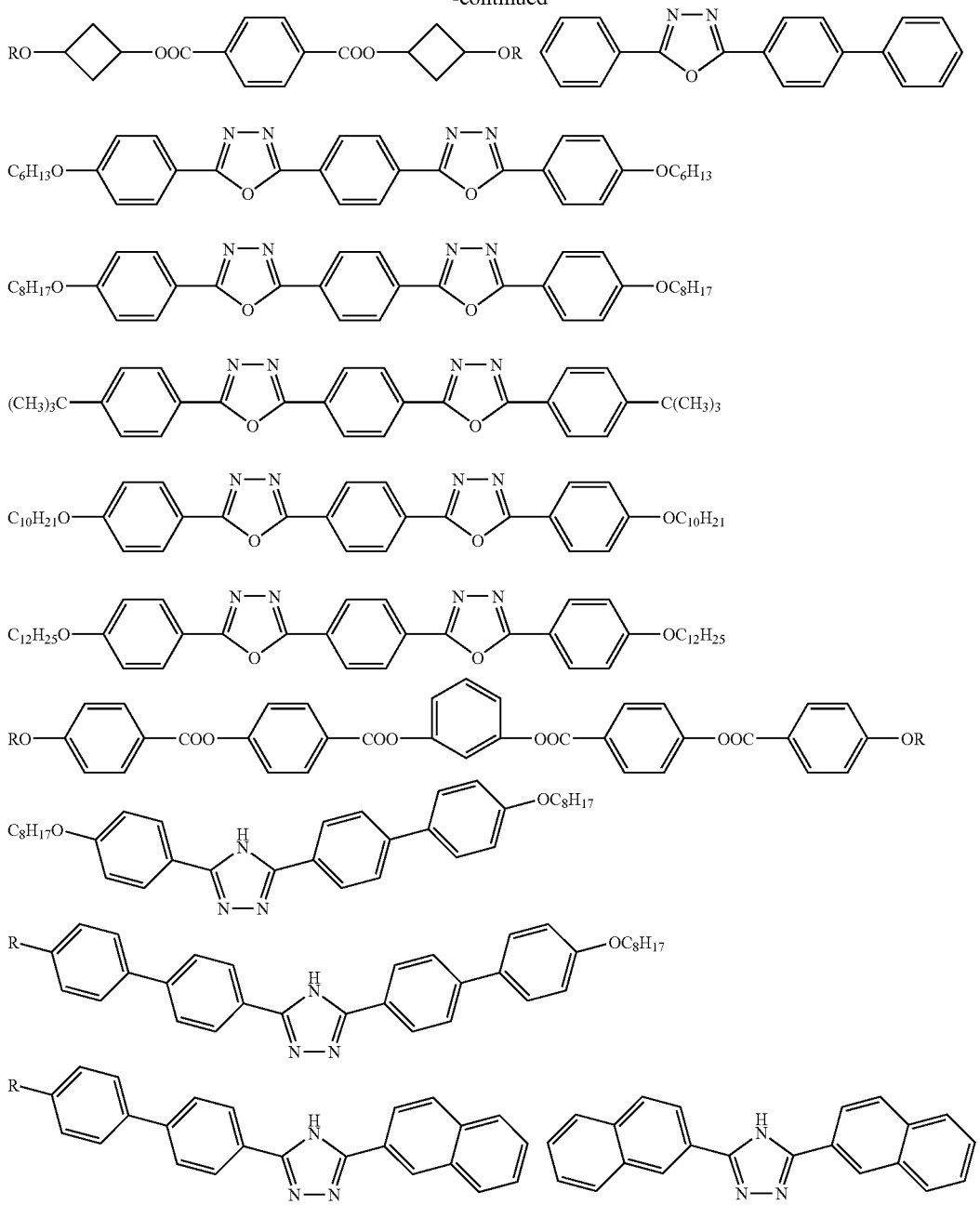

Such mesogens may be attached to the polymer backbone via a carbon atom on a benzene ring or a nitrogen atom on a triazole. In a preferred embodiment, the mesogen is attached to the polymer backbone via a carbon atom on the center 1,4-phenylene or a nitrogen atom on the heterocyclic ring.

Representatives and illustrative examples of preferred polymer moieties with mesogens having m is 1 or 2, n is 1 or 2, $A^2$ is 1,4-phenylene, and the mesogen is attached to the polymer backbone through $A^2$ include, but are not limited to:

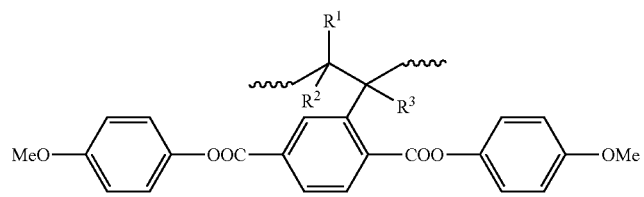

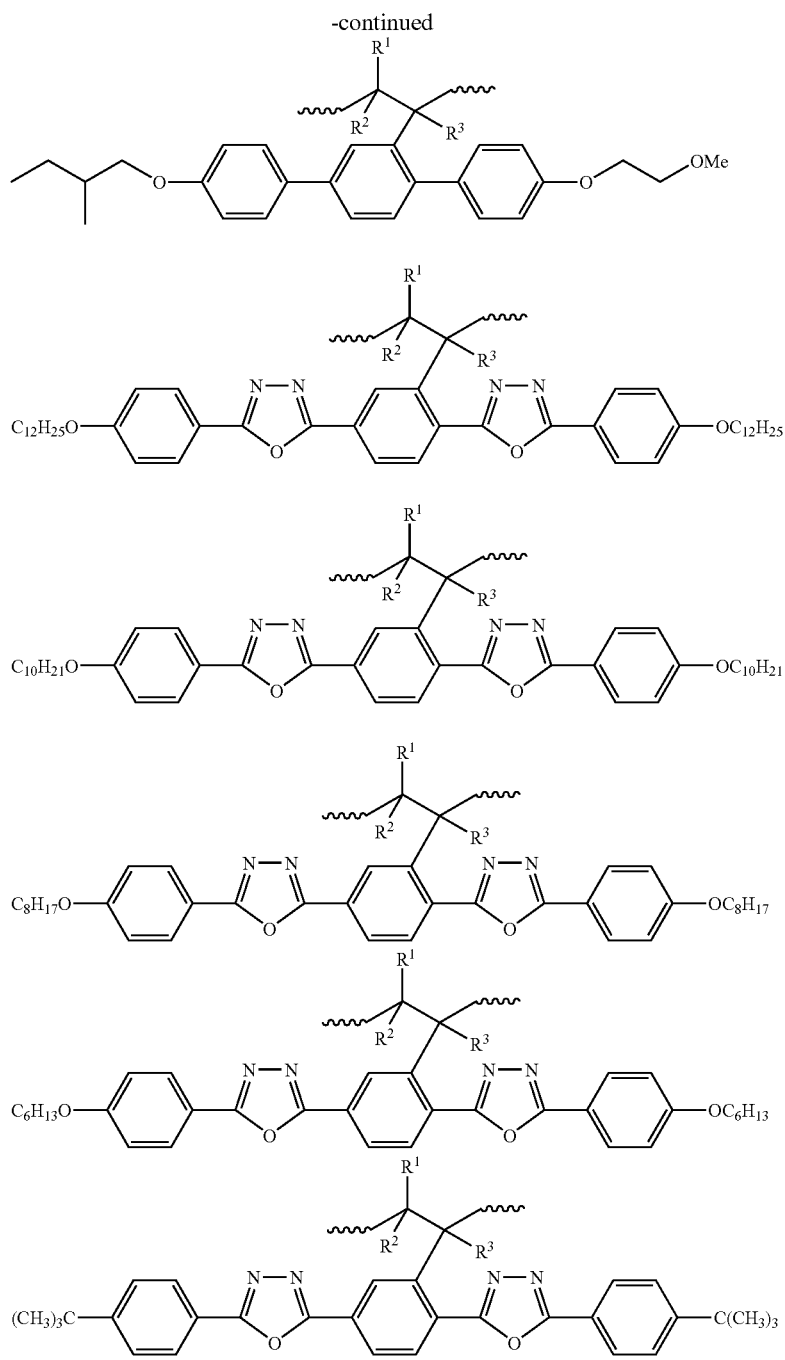
Representatives and illustrative examples of preferred polymer moieties with mesogens having m is 2, n is 2, $A^2$ is 1,4-phenylene, and the mesogen is attached to the polymer backbone through $A^2$ include, but are not limited to:
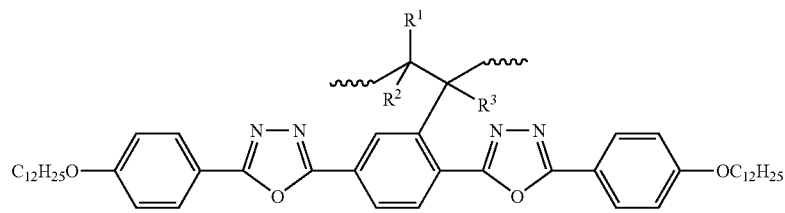

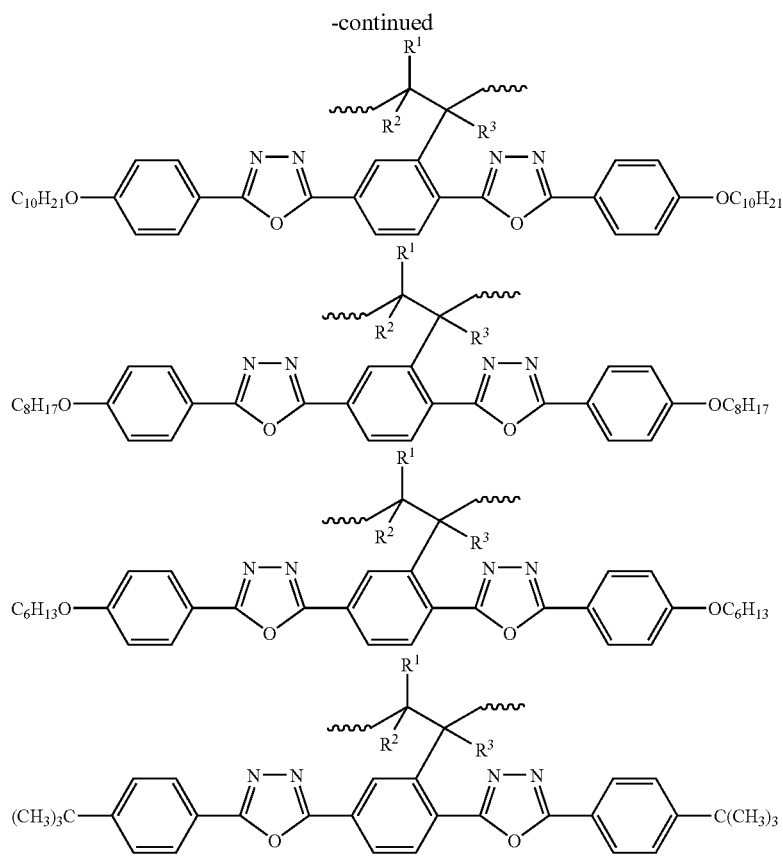

wherein $R^1$, $R^2$, and $R^3$ are hydrogen atoms, alkyl groups, or halogens.

In one example embodiment of the invention, an optical film is solution cast from polymer compositions with one or more moieties of a mesogen having m is 2, n is 2, $A^2$ is 1,4-phenylene, and being attached to the polymer backbone through $A^2$. This mesogen-jacketed polymer film has an absorption maxima between the wavelengths of about 300 nm and about 350 nm and a positive birefringence greater than about 0.015 throughout 400 nm<$\lambda$<800 nm. Representative and illustrative examples of such polymer moieties include, but are not limited to:

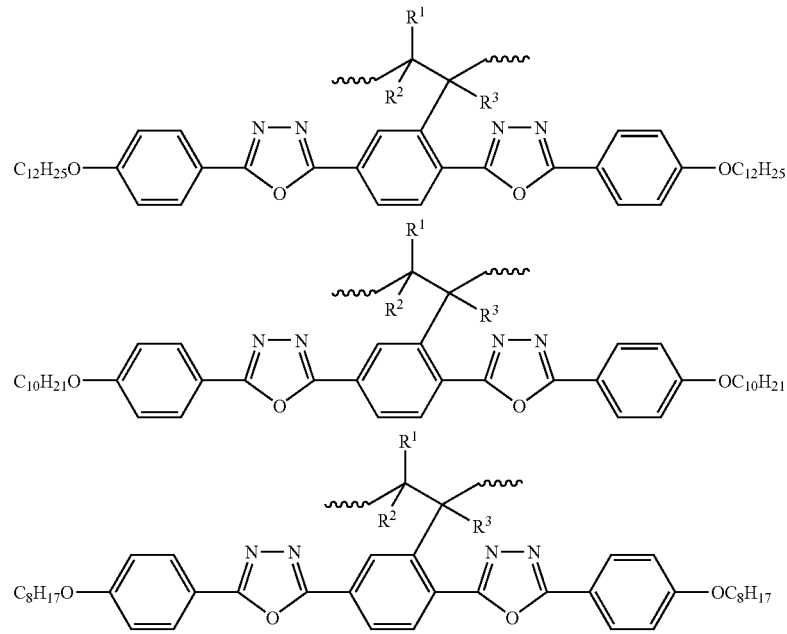

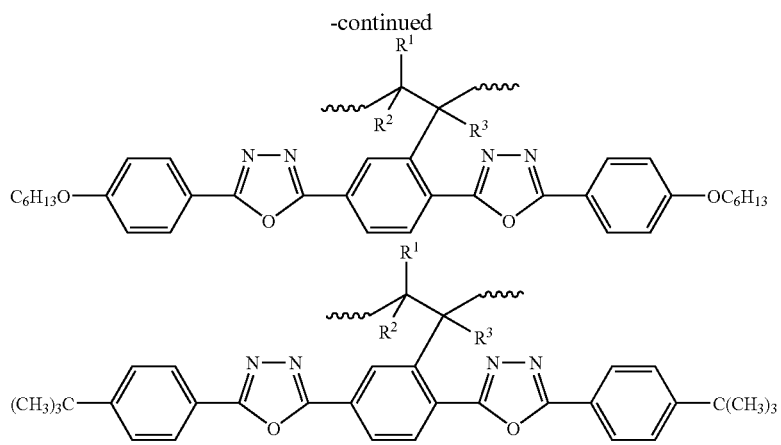

wherein R[1], R[2], and R[3] are hydrogen atoms, alkyl groups, or halogens.

MJPs of the invention may be prepared by polymerization of a mesogen monomer having a vinyl group attached to one of its rings, preferably an aromatic ring such as benzene. The polymerization may be carried out by a method known in the art such as bulk, solution, emulsion, or suspension polymerization. The reaction may be free radical, cationic, anionic, zwitterionic, Ziegler-Natta, or atom transfer radical type of polymerization. See Zhou, Q. F., et al. *Macromolecules,* 1987, 20, p. 233; Zhang, D., et al., *Macromolecules,* 1999, 32, p. 5183; Zhang, D., et al., *Macromolecule,* 1999, 32, p. 4494; and Chen, X., et al., *Macromolecules,* 2006, 39, p. 517.

Representatives and illustrative examples of mesogen monomers with polymerizable vinyl groups suitable for the invention include, but are not limited to:

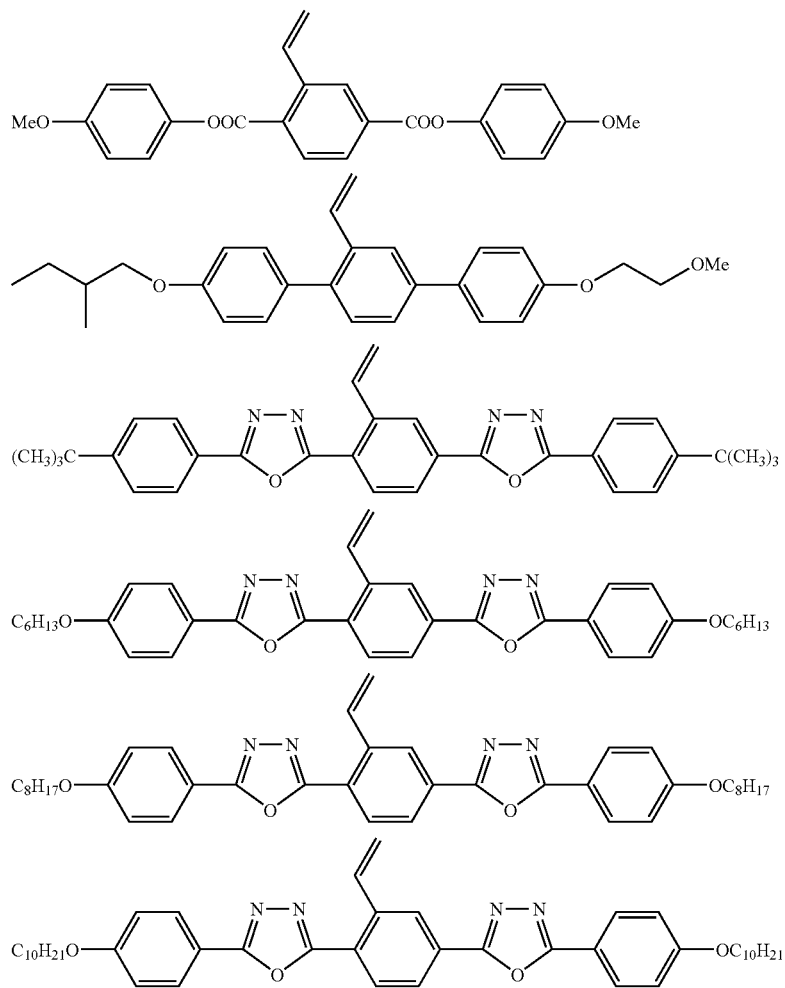

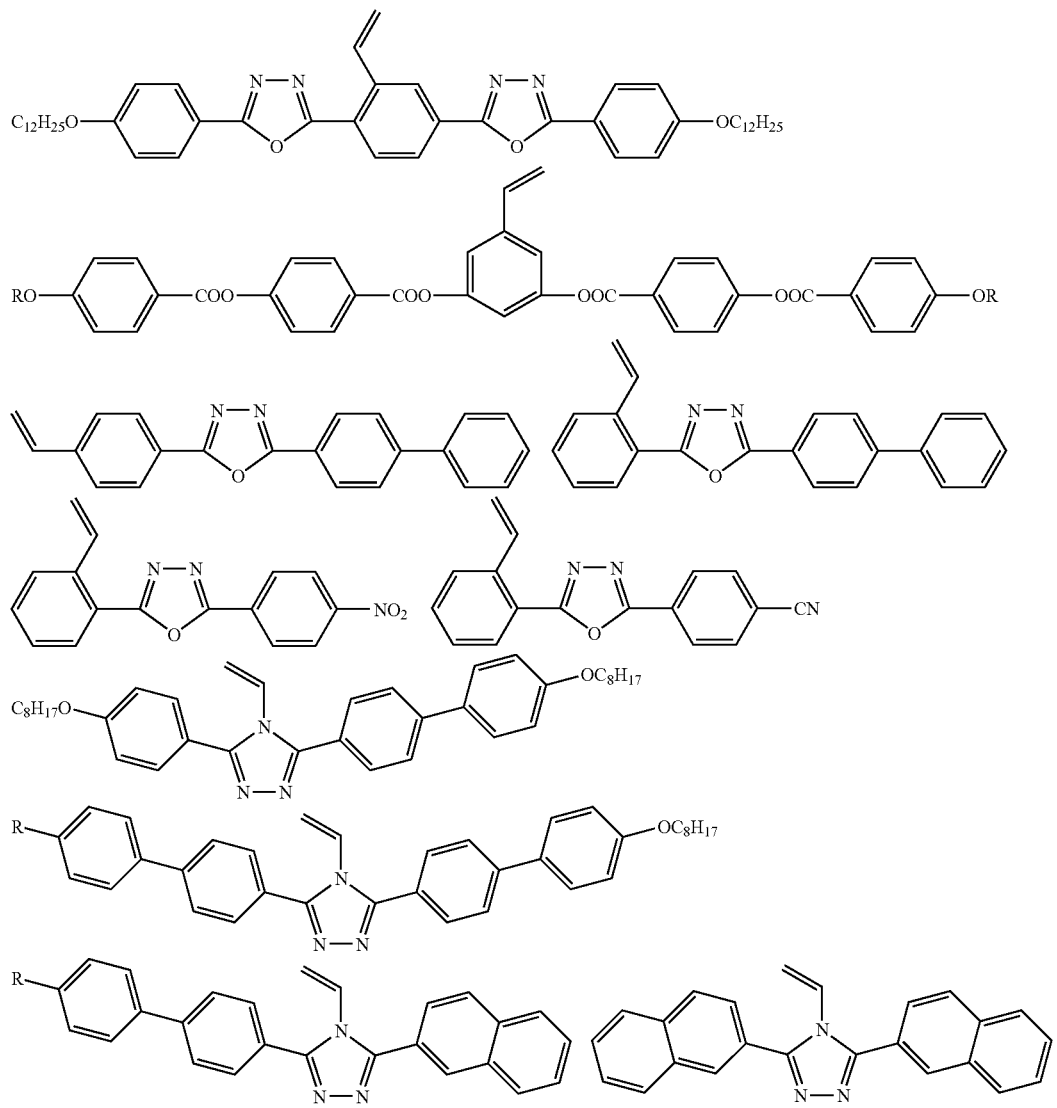
Representatives and illustrative examples of preferred mesogen monomers with polymerizable vinyl groups suitable for the invention include, but are not limited to:
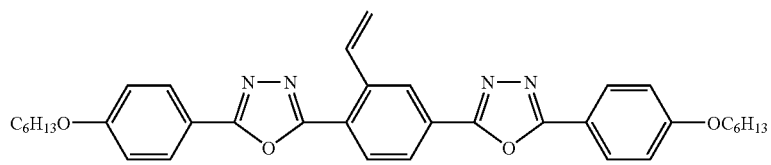
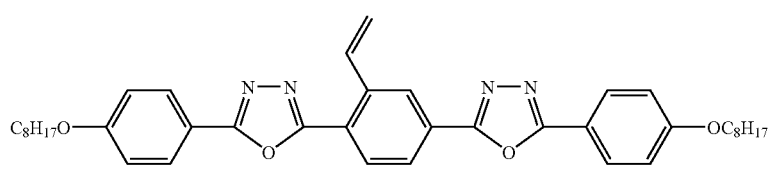

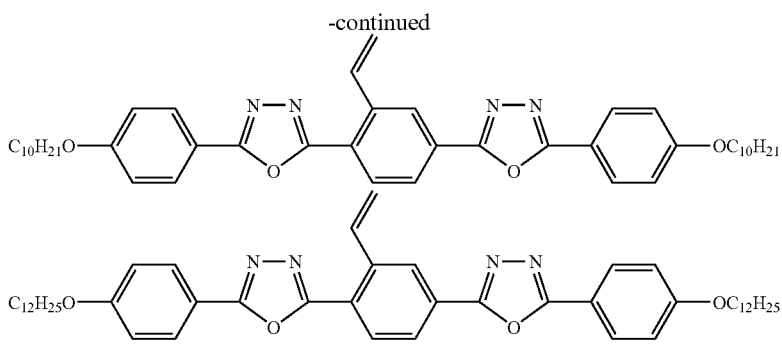

Polymers with these moieties have a positive birefringence greater than about 0.02 throughout the wavelength range of 400 nm<λ<800 nm.

MJPs of the present invention may also be prepared by copolymerization of a mesogen monomer having one vinyl group with one or more ethylenically unsaturated monomers. Representatives and illustrative examples of ethylenically unsaturated monomers that may be used for copolymerization with mesogen-containing monomers include, but are not limited to, one or more of methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethyolpropyl triacrylate, styrene, α-methyl styrene, vinyl naphthalene, nitrostyrene, bromostyrene, iodostyrene, cyanostyrene, chlorostyrene, 4-t-butylstyrene, vinyl biphenyl, vinyl triphenyl, vinyl toluene, chloromethyl styrene, acrylic acid, methacrylic acid, itaconic acid, crotonic acid, maleic anhydride, glycidyl methacrylate, carbodiimide methacrylate, $C_1$-$C_{18}$ alkyl crotonates, di-n-butyl maleate, α- or β-vinyl naphthalene, di-octylmaleate, allyl methacrylate, di-allyl maleate, di-allylmalonate, methyoxybutenyl methacrylate, isobornyl methacrylate, hydroxybutenyl methacrylate, hydroxyethyl(meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl(meth) acrylate, methacrylamide, acrylamide, butyl acrylamide, ethyl acrylamide, diacetoneacrylamide, butadiene, vinyl ester monomers, vinyl(meth)acrylates, isopropenyl(meth) acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethylene urea. Further monomers are described in The Brandon Associates, 2nd edition, 1992 Merrimack, N. H., and in Polymers and Monomers, the 1966-1997 Catalog from Polyscience, Inc., Warrington, Pa., U.S.A.

As one of skill in the art will recognize, MJP may also be prepared by first synthesizing a functionalized polymer and then subsequently reacting the polymer with a small molecule to obtain the desired mesogen structure.

Solution film casting may be done with MJPs, a polymer solution comprising a blend of MJPs with other polymers, or a copolymer of MJPs, the latter two being advantageous because they may improve film quality and lower cost. Polymer solutions may further contain other ingredients such as other polymers or additives. MJPs of the invention are soluble in toluene, methyl isobutyl ketone (MIBK), methyl ethyl ketone (MEK), cyclopentanone, N,N-dimethylformamide or a mixture thereof depending on the structures of the mesogens. Preferred solvents are toluene and MIBK. Optical films can be cast onto a substrate from the resulting polymer solutions by a method known in the art such as, for example, spin coating, as described above.

In another embodiment of the invention, the OASU is attached directly to the polymer backbone through two independent covalent bonds so the moiety has the general formula:

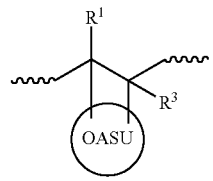

wherein $R^1$, $R^2$, and $R^3$ are each independently hydrogen atoms, alkyl groups, substituted alkyl groups, or halogens, and OASU is an optically anisotropic sub-unit.

Representatives and illustrative examples of such polymer moieties having OASU attached directly to the polymer backbone through two independent covalent bonds include, but are not limited to:

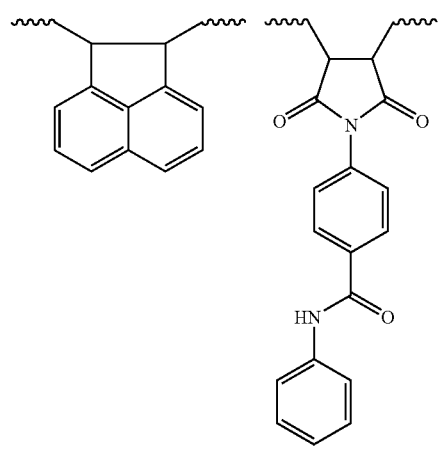

-continued

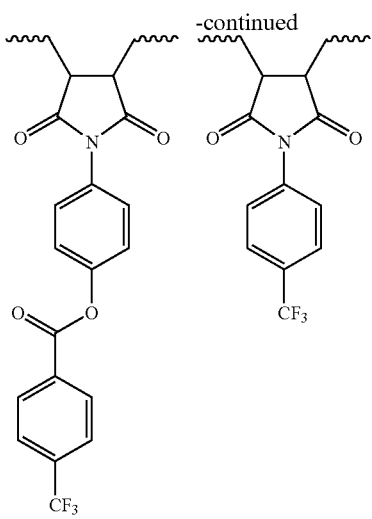

Representatives and illustrative examples of monomers that may be used to prepare homopolymers or copolymers having OASU attached directly to the polymer backbone through two independent covalent bonds include, but are not limited to:

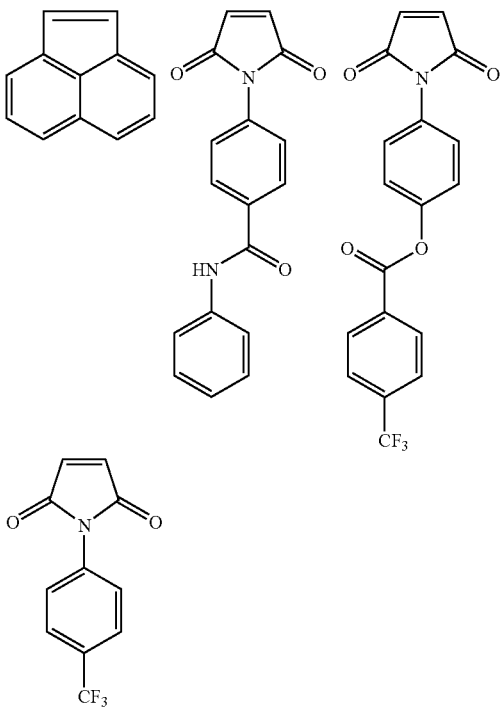

Examples of polymers having the above OASU containing moiety and which can be solution cast into thin films having a positive birefringence bigger than 0.002 have been disclosed in our U.S. patent application Ser. Nos. 11/731,142; 11/731,284; 11/731,285; 11/731,366; and 11/731,367 filed Mar. 29, 2007, the entirety of which is incorporated herein by reference. Preferred polymers are poly(nitrostyrene), poly (bromostyrene), poly(iodostyrene), poly(4-methylstyrene-co-nitrostyene), poly(cyanostyrene), poly(vinylbiphenyl), poly(N-vinyl-4-tert-butylphthalimide), poly(2-vinylnaphthalene), poly[2,5-bis(p-alkoxyphenyl)styrene], and poly {2,5-bis[5-(4-alkoxyphenyl)-1,3,4-oxadiazole]styrene}. The most preferred polymer are poly(nitrostyrene) and poly(bromostyrene).

In a preferred embodiment, the polymer film is poly(nitrostyrene). The poly(nitrostyrene) may have a positive birefringence greater than 0.002 throughout the wavelength range of 400 nm<$\lambda$<800 nm. The poly(nitrostyrene) may have a degree of substitution greater than 0.3 or greater than 0.5 for the nitro group. The poly(nitrostyrene) may have some para-nitro groups or have mostly para-nitro groups. In one embodiment, poly(nitrostyrene) has mostly para-nitro groups and a degree of substitution greater than 0.3 or greater than 0.5 for the nitro group.

In another preferred embodiment, the polymer is poly(bromostyrene). The poly(bromostyrene) may have a positive birefringence greater than 0.002 throughout the wavelength range of 400 nm<$\lambda$<800 nm. The poly(bromostyrene) may have a degree of substitution greater than 0.3 or greater than 0.5 for the bromo group. The poly(bromostyrene) may have some para-bromo groups or have mostly para-bromo groups. In one embodiment, poly(bromostyrene) has mostly para-bromo groups and a degree of substitution greater than 0.3 or greater than 0.5 for the bromo group.

As one of skill in the art will recognize, poly(nitrostyrene) may be prepared by nitration of polystyrene in the presence of a mixed acid of $HNO_3$ and $H_2SO_4$ as disclosed in Philippides, A., et al., *Polymer* (1993), 34(16), 3509-13; Fernandez, M. J., et al., *Polymer Degradation and Stability* (1998), 60(2-3), 257-263; Cowie, J. M. G., et al., *European Polymer Journal* (1992), 28(2), 145-8; and Al-Najjar, Mohammed M, et al., *Polymer Engineering and Science* (1996), 36(16), 2083-2087. Nitration of polystyrene can be carried out in the presence of an organic solvent such as nitrobenzene, 1,2-dichloroethane, 3-nitrotoluene, carbon tetrachloride, chloroform, methylene chloride, carbon disulfide, N,N-dimethylformamide, N,N-dimethylacetamide, N-methylpyrolidone, or a mixture thereof. Preferred solvents are nitrobenzene and a 3:1 mixture of nitrobenzene and 1,2-dichloroethane. Copolymers of nitrostyrene may be prepared by nitration of a copolymer of styrene such as poly(styrene-co-acrylonitrile), poly(styrene-co-4-t-butylstyrene), and poly(styrene-co-methyl methacrylate). They can also be prepared by copolymerization of nitrostyrene with other ethylenically unsaturated monomers such as methyl methacrylate, acrylonitrile, 4-t-butylstyrene, 4-methylstyrene, butyl acrylate, and acrylic acid. Poly(nitrostyrene) can also be prepared by polymerization of nitrostyrene monomer as disclosed in Philippides, A. et al., Polymer (1994), 35(8), 1759-63; and Jonquieres, A. et al., *Polymer Bulletin* (Berlin), (1994), 33(4), 389-95. Trifluoroacetic anhydride and trifluoroacetic acid may be used with nitric acid as the nitration agent. Inorganic nitrate salts such as $NH_4NO_3$, $NaNO_3$, $KNO_3$, and $AgNO_3$ may also be used with trifluoroacetic anhydride as the nitration agent as disclosed in Grivello, J. V., *J. Org. Chem.* (1981), 46, 3056-3060.

The poly(nitrostyrene) polymers prepared in this invention are soluble in toluene, methyl isobutyl ketone (MIBK), methyl ethyl ketone (MEK), cyclopentanone, N,N-dimethylformamide or a mixture thereof depending on the degree of substitution of the nitro group. Preferred solvents for film casting poly(nitrostyrene) are cyclopentanone, toluene, and MIBK or a mixture thereof.

As one of skill in the art will recognize, poly(bromostyrene) may be prepared by bromination of polystyrene in the presence of bromine and a Lewis acid catalyst such as $AlCl_3$, $FeCl_3$, $AlBr_3$, $BF_3$, $FeBr_3$, $SbCl_5$, $ZrCl_4$, $Sb_2O_3$, and the like, as disclosed in U.S. Pat. Nos. 5,677,390 and 5,532,322, which are incorporated by reference in their entirety. It may also be prepared by reaction of polystyrene with n-butyllithium-TMEDA complex followed by bromine quenching as disclosed in Farrall, M. J. and Frechet, M. J., *Macromolecules, Vol.* 12; p. 426, (1979). Similar to poly(nitrostyrene), poly(bromostyrene) may also be prepared by polymerization of bromostyrene monomer as described in Farrall, M. J. and Frechet, M. J., *Macromolecules, Vol.* 12; p. 426, (1979). Likewise, copolymers of bromostyrene may also be prepared as described previously for poly(nitrostyrene). Bromination of polystyrene can be carried out in the presence of an organic solvent such as, for example, 1,2-dichloroethane, nitrobenzene, 3-nitrotoluene, carbon tetrachloride, chloroform, methylene chloride, carbon disulfide, N,N-dimethylformamide, N,N-dimethylacetamide, N-methylpyrrolidone, or a mixture thereof. Preferred solvents are 1,2-dichloroethane, carbon tetrachloride, and chloroform.

A polymer solution may be prepared by dissolving one or more of the above OASU-containing polymers in a solvent. Suitable solvents include toluene, methyl isobutyl ketone, methyl ethyl ketone, cyclopentanone, chloroform, dichloromethane, dichloroethane, benzene, chlorobenzene, xylene, N,N-dimethylformamide, N,N-dimethylacetamide, N-methyl-2-pyrrolidone, pyridine, dimethylsulfoxide, acetonitrile, cyclohexanone, methyl amyl ketone, ethyl acetate, ethylene glycol monobutyl ether, tetrahydrofurane, a mixture of thereof, and the like. Preferred solvents are toluene, methyl isobutyl ketone (MIBK), methyl ethyl ketone (MEK), and cyclopentanone.

The polymer solution described above may further contain other ingredients such as other polymers or additives. Examples of additives include plasticizer, UV stabilizer, antioxidizing agent, dye, and pigment. The plasticizer may be, for example, a phosphoric ester or a carboxylic acid ester, such as triphenyl phosphate, trioctyl phosphate, tributyl phosphate, dimethyl phthalate, diethyl phthalate, dioctyl phthalate, and the like.

Additionally, the polymer solution can also contain inorganic fine particles to enhance the mechanical properties of the film for stretching or processing. Examples of inorganic fine particles include silicon oxide, aluminum oxide, zinc oxide, titanium dioxide, calcium silicate, magnesium silicate, aluminum silicate, calcium phosphate, and the like. The particles may be untreated or may be surface- or chemically-treated with an organic compound such as alkoxysilane, siloxane, or hydrocarbon. Examples of commercially available silicon oxide include AEROSIL 200, 300, 380, R805, R812, R816, R972, and R974 from Degussa AG.

The unstretched polymer film can then be prepared by applying the polymer solution onto a substrate with a method known in the art such as, for example, spin coating, spray coating, roll coating, curtain coating, or dip coating. Suitable substrates include glass, metal, ceramic, polyester, polycarbonate, cellulose ester, polyacrylate, polyolefin, cyclic olefin polymer, polyurethane, and the like. The cast film is allowed to dry at an ambient condition or under a controlled condition for solvent evaporation. The dried film may be removed from the substrate to yield a free-standing film. Alternatively, it should be understood that this film may also be prepared by melt extrusion or by any other film forming technique know in the art.

The film thus obtained is subject to longitudinal uniaxial stretching at a suitable temperature to a certain stretch ratio that is capable of yielding a desirable refractive index profile. The stretching method may be carried out by using any appropriate stretching device such as roll stretching or tenter machine.

In a further aspect, this invention provides an LCD device which comprises an optical compensation film based on the stretched polymer film of the present invention. In another aspect, said LCD device is an IPS mode LCD.

In another embodiment, this invention provides a method for the preparation of a negative A-plate for retardation compensation of an LCD device, which comprises the steps of
i. preparing a polymer solution, which comprises a polymer having a moiety of

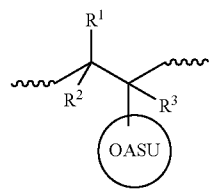

wherein $R_1$, $R_2$, and $R_3$ are each independently hydrogen atoms, alkyl groups, substituted alkyl groups, or halogens, wherein OASU is an optically anisotropic sub-unit that is a substituted aromatic group, a disk-like group, or a mesogen, and wherein OASU is attached to the polymer backbone through a single covalent bond, ii. applying the polymer solution to a substrate and the coating allowed to dry, iii. removing the dried film from the substrate to give a polymer film having a refractive index profile of $n_x=n_y<n_z$ and the relation of $n_z-(n_x+n_y)/2>$ about 0.002, and iv. uniaxially stretching the resulting polymer film at a suitable temperature to an elongation that is capable of yielding a refractive index profile of $n_x<n_y=n_z$, wherein $n_x$ is the in-plane refractive index parallel to the film stretching direction, $n_y$ is the in-plane refractive index perpendicular to $n_x$, and $n_z$ is the thickness refractive index.

In another embodiment, this invention provides a method for the preparation of a negative A-plate for retardation compensation of an LCD device, which comprises the steps of
i. selecting a polymer resin whose structure comprises a moiety of

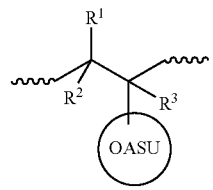

wherein $R_1$, $R_2$, and $R_3$ are each independently hydrogen atoms, alkyl groups, substituted alkyl groups, or halogens, wherein OASU is an optically anisotropic sub-unit that is a substituted aromatic group, a disk-like group, or a mesogen, and wherein OASU is attached to the polymer backbone through a single covalent bond, ii. converting the polymer to a film by melt extrusion or any other film forming technique known in the art, iii. uniaxially stretching the resulting polymer film at a suitable temperature to an elongation that is capable of yielding a refractive index profile of $n_x<n_y=n_z$, wherein $n_x$ is the in-plane refractive index parallel to the film stretching direction, $n_y$ is the in-plane refractive index perpendicular to $n_x$, and $n_z$ is the thickness refractive index.

In yet another embodiment, this invention provides a method for the preparation of a biaxial birefringent plate for retardation compensation of an LCD device, which comprises the steps of i. preparing a polymer solution, which comprises a polymer having a moiety of

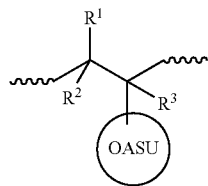

wherein $R_1$, $R_2$, and $R_3$ are each independently hydrogen atoms, alkyl groups, substituted alkyl groups, or halogens, wherein OASU is an optically anisotropic sub-unit that is a substituted aromatic group, a disk-like group, or a mesogen, and wherein OASU is attached to the polymer backbone through a single covalent bond, ii. applying the polymer solution to a substrate and the coating allowed to dry, iii. removing the dried film from the substrate to give a polymer film having a refractive index profile of $n_x = n_y < n_z$ and the relation of $n_z - (n_x + n_z)/2 >$ about 0.002, and iv. uniaxially stretching the resulting polymer film at a suitable temperature to an elongation that is capable of yielding a refractive index profile of $n_x < n_y < n_z$, wherein $n_x$ is the in-plane refractive index parallel to the film stretching direction, $n_y$ is the in-plane refractive index perpendicular to $n_x$, and $n_y$ is the thickness refractive index.

In yet another embodiment, this invention provides a method for the preparation of a biaxial birefringent plate for retardation compensation of an LCD device, which comprises the steps of i. preparing a polymer solution, which comprises a polymer having a moiety of

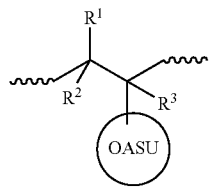

wherein $R_1$, $R_2$, and $R_3$ are each independently hydrogen atoms, alkyl groups, substituted alkyl groups, or halogens, wherein OASU is an optically anisotropic sub-unit that is a substituted aromatic group, a disk-like group, or a mesogen, and wherein OASU is attached to the polymer backbone through a single covalent bond, ii. applying the polymer solution to a substrate to form a coating on the substrate, iii. uniaxially stretching the coating and the substrate at a suitable temperature to an elongation that is capable of yielding a refractive index profile for the coating layer of $n_x < n_y < n_z$, wherein $n_x$ is the in-plane refractive index parallel to the film stretching direction, $n_y$ is the in-plane refractive index perpendicular to $n_x$, and $n_y$ is the thickness refractive index.

The temperature suitable for stretching may be around the Tg of the polymer, may be about 10-50° C. higher than the Tg, or may be about 10-100° C. lower than the Tg. The preferred temperature for stretching is about 10-100° C. lower than the Tg. In a preferred embodiment, the temperature suitable for stretching is about 10° C. higher than the Tg of the polymer. In a more preferred embodiment, the temperature suitable for stretching is about 10° C. lower than the Tg of the polymer.

Alternatively, in the above method, the film may be stretched while it still contains some solvent and is not completely dried (wet stretching). In this case, a lower temperature may be employed for stretching. It is also possible to stretch the film with a support underneath (e.g. on a steel belt); in this case, a higher temperature, for example, around the Tg of the polymer or about 10-30° C. higher may be used for stretching. The film may also be stretched without being removed from the substrate such as a TAC film.

The extension ratio (elongation) of the film after stretching may be 2-200% (defined as the percentage of the length that is longer than the unstretched film). The preferred extension ratio is 2-100%.

EXAMPLES

1. Preparation of Poly(Nitrostyrene)

Polystyrene (22.9 g) was stirred and dissolved in nitrobenzene (330 mL) in a three-neck round-bottom flask equipped with a mechanical stirrer. To the stirred mixture was added a mixed acid (nitro/styrene equivalent ratio=1.8/1) consisting of nitric acid (35.6 g) and concentrated sulfuric acid (35.6 g) dropwise in a period of 30 min. The mixture was allowed to react at room temperature under nitrogen for a total of 24 hours. The resulting yellow mixture was extracted with water for several times; the organic phase was separated and subsequently precipitated into methanol to give a solid mass. The solid was dissolved in N,N-dimethylformamide (DMF) and re-precipitated into methanol. The resulting solid product was filtered, washed repeatedly with methanol, and dried under vacuum to give a slightly yellowish fibrous powder (30.4 g).

2. Preparation of Poly(nitrostyrene) Film

A 10% solution of the above poly(nitrostyrene) in cyclopentanone was prepared and applied onto a glass plate by draw-down. The resulting coating was allowed to dry at room temperature for 24 hours to yield a film having a size of 6 cm×6 cm and a thickness of about 80 μm. The film was then peeled off and cut into 10 mm×5 mm strips.

3. Stretching of Poly(Nitrostyrene) Film

A strip of the poly(nitrostyrene) film prepared in Example 2 was mounted on an Instron® Universal Materials Testing Machine equipped with an environmental chamber. The film was then uniaxially stretched at 130° C. and 140° C. respectively to various extension ratios with a drawing speed of 50 mm/min. The refractive indices, $n_x$, $n_y$, and $n_z$, of the stretched films at various extension ratios were measured by using a prism coupler (Model 2010) from Metricon Corp. at 633 nm, wherein $n_x$ is the in-plane refractive index parallel to the film stretching direction, $n_y$ is the in-plane refractive index perpendicular to $n_x$, and $n_z$ is the thickness refractive index.

TABLE 1

Refractive indices, $n_x$, $n_y$, and $n_z$, of the stretched films at various extension ratios 130° C.

Poly(nitrostyrene) Film, 130° C., 50 mm/min

| Extension % | $n_x$ | $n_y$ | $n_z$ | $n_z - n_y$ | $n_y - n_x$ |
|---|---|---|---|---|---|
| 10 | 1.6023 | 1.6090 | 1.6119 | 0.0029 | 0.0067 |
| 17.5 | 1.5935 | 1.6121 | 1.6150 | 0.0029 | 0.0186 |
| 18 | 1.5947 | 1.6125 | 1.6145 | 0.0020 | 0.0178 |
| 25 | 1.5941 | 1.6140 | 1.6150 | 0.0010 | 0.0199 |
| 40 | 1.5891 | 1.6149 | 1.6176 | 0.0027 | 0.0258 |
| 40 | 1.5876 | 1.6154 | 1.6181 | 0.0027 | 0.0278 |
| 50 | 1.5889 | 1.6172 | 1.6185 | 0.0013 | 0.0283 |
| 55 | 1.5872 | 1.6178 | 1.6198 | 0.0020 | 0.0306 |
| 90 | 1.5814 | 1.6206 | 1.6222 | 0.0016 | 0.0392 |
| 100 | 1.5827 | 1.6197 | 1.6199 | 0.0002 | 0.0370 |
| 110 | 1.5821 | 1.6204 | 1.6207 | 0.0003 | 0.0383 |
| 120 | 1.5798 | 1.6208 | 1.6237 | 0.0029 | 0.0410 |

TABLE 2

Refractive indices, $n_x$, $n_y$, and $n_z$, of the stretched films at various extension ratios 140° C.

Poly(nitrostyrene) Film, 140° C., 50 mm/min

| Extension % | $n_x$ | $n_y$ | $n_z$ | $n_z - n_y$ | $n_y - n_x$ |
|---|---|---|---|---|---|
| 12.5 | 1.6028 | 1.6099 | 1.6106 | 0.0007 | 0.0071 |
| 15 | 1.5987 | 1.6105 | 1.6116 | 0.0011 | 0.0118 |
| 23 | 1.5981 | 1.6118 | 1.6132 | 0.0014 | 0.0137 |
| 25 | 1.5970 | 1.6126 | 1.6135 | 0.0009 | 0.0156 |
| 26 | 1.5961 | 1.6122 | 1.6136 | 0.0014 | 0.0161 |
| 38 | 1.5883 | 1.6155 | 1.6169 | 0.0014 | 0.0272 |
| 51 | 1.5875 | 1.6180 | 1.6185 | 0.0005 | 0.0305 |
| 77 | 1.5857 | 1.6184 | 1.6194 | 0.0010 | 0.0327 |
| 85 | 1.5825 | 1.6189 | 1.6200 | 0.0011 | 0.0364 |
| 100 | 1.5824 | 1.6194 | 1.6201 | 0.0007 | 0.0370 |
| 140 | 1.5780 | 1.6223 | 1.6227 | 0.0004 | 0.0443 |
| 150 | 1.5760 | 1.6228 | 1.6235 | 0.0007 | 0.0468 |

4. Stretching of Poly(Nitrostyrene) Film

A strip of the poly(nitrostyrene) film prepared in Example 2 was mounted on an Instron® Universal Materials Testing Machine equipped with an environmental chamber. The film was then uniaxially stretched at 115° C. and 125° C. respectively to various extension ratios with a drawing speed of 50 mm/min. The refractive indices, $n_x$, $n_y$, and $n_z$, of the stretched films at various extension ratios were measured by using a prism coupler (Model 2010) from Metricon Corp. at 633 nm, wherein $n_x$ is the in-plane refractive index parallel to the film stretching direction, $n_y$ is the in-plane refractive index perpendicular to $n_x$, and $n_z$ is the thickness refractive index.

TABLE 3

Refractive indices, $n_x$, $n_y$, and $n_z$, of the stretched films at various extension ratios 115° C.

115° C.

| Extension % | $n_x$ | $n_y$ | $n_z$ | $n_y - n_x$ | $n_z - (n_x + n_y)/2$ |
|---|---|---|---|---|---|
| 0 | 1.5955 | 1.5955 | 1.6050 | 0.0000 | 0.0095 |
| 10 | 1.5979 | 1.6074 | 1.6128 | 0.0095 | 0.0101 |
| 25 | 1.5898 | 1.6106 | 1.6153 | 0.0208 | 0.0151 |
| 25 | 1.5907 | 1.6109 | 1.6157 | 0.0202 | 0.0149 |
| 35 | 1.5863 | 1.6130 | 1.6178 | 0.0267 | 0.0181 |
| 60 | 1.5760 | 1.6183 | 1.6221 | 0.0423 | 0.0250 |
| 70 | 1.5743 | 1.6198 | 1.6230 | 0.0455 | 0.0260 |

TABLE 4

Refractive indices, $n_x$, $n_y$, and $n_z$, of the stretched films at various extension ratios 125° C.

125° C.

| Extension % | $n_x$ | $n_y$ | $n_z$ | $n_y - n_x$ | $n_z - (n_x + n_y)/2$ |
|---|---|---|---|---|---|
| 0 | 1.5955 | 1.5955 | 1.6050 | 0.0000 | 0.0095 |
| 16 | 1.5932 | 1.6111 | 1.6151 | 0.0179 | 0.0130 |
| 20 | 1.5936 | 1.6116 | 1.6161 | 0.0180 | 0.0135 |
| 20 | 1.5950 | 1.6101 | 1.6144 | 0.0151 | 0.0119 |
| 23 | 1.5939 | 1.6125 | 1.6155 | 0.0186 | 0.0123 |
| 40 | 1.5824 | 1.6160 | 1.6201 | 0.0336 | 0.0209 |
| 70 | 1.5769 | 1.6203 | 1.6233 | 0.0434 | 0.0247 |
| 70 | 1.5758 | 1.6186 | 1.6221 | 0.0428 | 0.0249 |
| 110 | 1.5739 | 1.6200 | 1.6237 | 0.0461 | 0.0267 |

5. Preparation of Poly(Bromostyrene)

Polystyrene (50.0 g) (Mw 350,000; Aldrich) was stirred and dissolved in 1,2-dichloroethane (500 g) in a one-liter, three-neck round-bottom flask equipped with a mechanical stirrer, a nitrogen inlet, and a nitrogen outlet. The nitrogen pressure was set at 0.2 SCFH to allow the gas to flow through the reactor; the acid fume generated during the reaction was carried out by the gas to the surface above a diluted NaOH solution through a tube. To the stirred mixture was added $AlCl_3$ (1.0 g) followed by the addition of bromine (111.0 g) (Br/styrene equivalent ratio, 1.45/1) dropwise in a period of one hour. The mixture was allowed to react at room temperature under nitrogen for a total of 6 hours. The resulting red mixture was poured into diluted NaOH solution and the organic layer separated, which was subsequently precipitated into methanol to give a soft solid mass. The solid was dissolved in cyclopentanone (about 300 g), re-ppt into methanol, and the ppt. isolated. The fibrous solid was stirred in methanol for several hours, filtered, washed repeatedly with methanol, and dried under vacuum. Yield: 93 g (slightly yellow). Tg: 149° C.

6. Preparation of Poly(Bromostyrene) Film

A 10% solution of poly(bromostyrene) in cyclopentanone was prepared and applied onto a glass plate by draw-down. The resulting coating was allowed to dry at room temperature for 24 hours to yield a film having a size of 6 cm×6 cm and a thickness of about 80 μm. The film was then peeled off and cut into 10 mm×5 mm stripe.

7. Stretching of Poly(Bromostyrene) Film

A strip of the poly(bromostyrene) film prepared above was mounted on an Instron® Universal Materials Testing Machine equipped with an environmental chamber. The film was then uniaxially stretched at 100° C. to various extension ratios with a drawing speed of 50 mm/min. The refractive indices, $n_x$, $n_y$, and $n_z$, of the stretched films at various extension ratios were measured by using a prism coupler (Model 2010) from Metricon Corp. at 633 nm wherein $n_x$ is the in-plane refractive index parallel to the film stretching direction, $n_y$ is the in-plane refractive index perpendicular to $n_x$, and $n_z$ is the thickness refractive index. The data is collected below.

TABLE 5

Refractive indices, $n_x$, $n_y$, and $n_z$, of the stretched films at various extension ratios Poly(bromostyrene) Film, 100° C., 50 mm/min

| Extension % | $n_x$ | $n_y$ | $n_z$ | $n_z - n_y$ | $n_y - n_x$ |
|---|---|---|---|---|---|
| 5 | 1.6181 | 1.6211 | 1.6221 | 0.0010 | 0.0030 |
| 13 | 1.6172 | 1.6213 | 1.6221 | 0.0008 | 0.0041 |
| 40 | 1.6143 | 1.6256 | 1.6256 | 0.0000 | 0.0113 |
| 47 | 1.6137 | 1.6235 | 1.6234 | −0.0001 | 0.0098 |
| 60 | 1.6133 | 1.6250 | 1.6251 | 0.0001 | 0.0117 |
| 63 | 1.6124 | 1.6269 | 1.6270 | 0.0001 | 0.0145 |
| 80 | 1.6133 | 1.6274 | 1.6276 | 0.0002 | 0.0141 |
| 90 | 1.6091 | 1.6274 | 1.6273 | −0.0001 | 0.0183 |
| 100 | 1.6102 | 1.6279 | 1.6279 | 0.0000 | 0.0177 |

What is claimed is:

1. A uniaxially stretched polymer film having a refractive index profile of $n_x < n_y \le n_z$, which satisfies the relation of $n_y - n_x > 0.001$, wherein $n_x$ is the in-plane refractive index parallel to the film stretching direction, $n_y$ is the in-plane refractive index perpendicular to $n_x$, and $n_z$ is the thickness refractive index, where the stretched polymer film is prepared by stretching an unstretched polymer film made from a polymer capable of being solution cast into a positive C plate with a refractive index profile of $n_x = n_y < n_z$ and the relation of $n_z - (n_x + n_y)/2 > 0.002$, wherein the unstretched polymer film is prepared by solution casting a polymer solution comprising a polymer having a moiety of

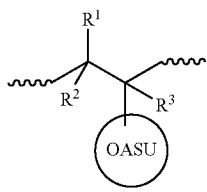

wherein $R_1$, $R_2$, and $R_3$ are each independently hydrogen atoms, alkyl groups, substituted alkyl groups, or halogens, wherein OASU is an optically anisotropic sub-unit that is a substituted aromatic group, a disk-like group, or a mesogen, and wherein OASU is attached to the polymer backbone through a single covalent bond.

2. The uniaxially stretched polymer film of claim 1, having a refractive index profile of $n_x < n_y = n_z$.

3. The uniaxially stretched polymer film of claim 2, wherein the unstretched polymer film has a positive birefringence, which satisfies the relations of $n_z > n_x = n_y$ and $n_z - (n_x + n_y)/2 > 0.002$.

4. The uniaxially stretched polymer film of claim 3, wherein the unstretched polymer film has a positive birefringence $n_z - (n_x + n_y)/2$ greater than 0.003.

5. The uniaxially stretched polymer film of claim 3, wherein the unstretched polymer film has a positive birefringence $n_z - (n_x + n_y)/2$ greater than 0.005.

6. The uniaxially stretched polymer film of claim 2, which satisfies the relation of $n_y - n_x > 0.002$.

7. The uniaxially stretched polymer film of claim 2, which satisfies the relation of $n_y - n_x > 0.003$.

8. The uniaxially stretched polymer film of claim 1, wherein the stretched polymer film is a free standing film, and wherein said stretched polymer film has $n_y - n_x$ in the range of ≥0.001 to 0.05.

9. The uniaxially stretched polymer film of claim 8, wherein $n_y - n_x$ is in the range of 0.002 to 0.05.

10. The uniaxially stretched polymer film of claim 9, wherein $n_y - n_x$ is in the range of 0.003 to 0.05.

11. The uniaxially stretched polymer film of claim 10, wherein $n_y - n_x$ is in the range of 0.004 to 0.05.

12. The uniaxially stretched polymer film of claim 1, wherein said polymer film is a coating deposited on a substrate, and wherein said polymer film has a refractive index profile of $n_x < n_y = n_z$, and $n_y - n_x$ in the range of 0.003 to 0.1.

13. The uniaxially stretched polymer film of claim 12, wherein $n_y - n_x$ in the range of 0.005 to 0.1.

14. The uniaxially stretched polymer film of claim 13, wherein $n_y - n_x$ in the range of 0.01 to 0.1.

15. The uniaxially stretched polymer film of claim 14, wherein $n_y - n_x$ in the range of 0.02 to 0.1.

16. The uniaxially stretched polymer film of claim 1, wherein the extension ratio of the stretched polymer film is from 2% to 200% and the stretched polymer film has $n_y - n_x$ in the range of ≥0.001 to 0.1.

17. The uniaxially stretched polymer film of claim 16, wherein the extension ratio of the stretched polymer film is from 2% to 200% and the stretched polymer film has $n_y - n_x$ in the range of ≥0.001 to 0.05.

18. The uniaxially stretched polymer film of claim 16, wherein the extension ratio of the stretched polymer film is from 2% to 100% and the stretched polymer film has $n_y - n_x$ in the range of ≥0.001 to 0.1.

19. The uniaxially stretched polymer film of claim 18, wherein the extension ratio of the stretched polymer film is from 2% to 100% and the stretched polymer film has $n_y - n_x$ in the range of ≥0.001 to 0.05.

20. The uniaxially stretched polymer film of claim 1, wherein the polymer is selected from the group consisting of poly(nitrostyrene), poly(bromostyrene), poly(iodostyrene), poly(4-methylstyrene-co-nitrostyene), poly(cyanostyrene), poly(vinylbiphenyl), poly(N-vinyl-4-tert-butylphthalimide), poly(2-vinylnaphthalene), poly[2,5-bis(p-alkoxyphenyl)styrene], and poly {2,5-bis[5-(4-alkoxyphenyl)-1,3,4-oxadiazole]styrene}.

21. The uniaxially stretched polymer film of claim 1, wherein the polymer is poly(nitrostyrene) or poly(bromostyrene).

22. The uniaxially stretched polymer film of claim 1, having a refractive index profile of $n_x < n_y < n_z$, which satisfies the relations of $n_y - n_x > 0.002$ and $n_z - (n_x + n_y)/2 > 0.002$.

23. The uniaxially stretched polymer film of claim 22, wherein the unstretched polymer film has a positive birefringence $n_z - (n_x + n_y)/2$ greater than 0.003.

24. The uniaxially stretched polymer film of claim 23, wherein the unstretched polymer film has a positive birefringence $n_z - (n_x + n_y)/2$ greater than 0.004.

25. The uniaxially stretched polymer film of claim 22, which satisfies the relations of $n_y - n_x > 0.003$ and $n_z - (n_x + n_y)/2 > 0.002$.

26. The uniaxially stretched polymer film of claim 25, which satisfies the relations of $n_y - n_x > 0.004$ and $n_z - (n_x + n_y)/2 > 0.002$.

27. The uniaxially stretched polymer film of claim 22, wherein the extension ratio of the stretched polymer film is from about 2% to about 200%, and the stretched polymer film has $n_y - n_x$ from about 0.002 to about 0.1 and $n_z - (n_x + n_y)/2$ from ≥0.002 to 0.05.

28. The uniaxially stretched polymer film of claim 27, wherein the extension ratio of the stretched polymer film is from 2% to 200% and the stretched polymer film has $n_y - n_x$ from 0.002 to 0.05 and $n_z - (n_x + n_y)/2$ from ≥0.002 to 0.025.

29. The uniaxially stretched polymer film of claim 17, wherein the extension ratio of the stretched polymer film is from 2% to 100% and the stretched polymer film has $n_y-n_x$ from 0.002 to 0.1 and $n_z-(n_x+n_y)/2$ from $\geq 0.002$ to 0.05.

30. The uniaxially stretched polymer film of claim 29, wherein the extension ratio of the stretched polymer film is from 2% to 100% and the stretched polymer film has $n_y-n_x$ from 0.002 to 0.05 and $n_z-(n_x+n_y)/2$ from $\geq 0.002$ to 0.025.

31. The uniaxially stretched polymer film of claim 22, wherein the polymer is poly(bromostyrene).

32. An LCD device comprising a retardation compensation film that is a uniaxially stretched polymer film of claim 1.

33. The LCD device of claim 32, wherein the device is an IPS-LCD.

\* \* \* \* \*